US010080324B2

(12) United States Patent
Sheppard et al.

(10) Patent No.: US 10,080,324 B2
(45) Date of Patent: Sep. 25, 2018

(54) AIR SEEDER HAVING INDIVIDUALLY CONTROLLABLE METERING WHEELS IN COMMON METER BODY

(71) Applicant: Morris Industries Ltd., Saskatoon (CA)

(72) Inventors: Clint W. Sheppard, Yorkton (CA); Lawrence S. Grodecki, Yorkton (CA)

(73) Assignee: Morris Industries Ltd., Saskatoon (CA)

( * ) Notice: Subject to any disclaimer, the term of this patent is extended or adjusted under 35 U.S.C. 154(b) by 0 days.

(21) Appl. No.: 15/405,126

(22) Filed: Jan. 12, 2017

(65) Prior Publication Data

US 2017/0196162 A1    Jul. 13, 2017

Related U.S. Application Data

(60) Provisional application No. 62/278,317, filed on Jan. 13, 2016.

(51) Int. Cl.
*A01C 7/08* (2006.01)
*A01C 7/12* (2006.01)
*A01C 19/02* (2006.01)

(52) U.S. Cl.
CPC ............. *A01C 19/02* (2013.01); *A01C 7/081* (2013.01); *A01C 7/12* (2013.01)

(58) Field of Classification Search
CPC .. A01C 7/081; A01C 7/08; A01C 7/00; A01C 7/12; A01C 19/02; A01C 19/00
See application file for complete search history.

(56) References Cited

U.S. PATENT DOCUMENTS

| 7,555,990 | B2 | 7/2009 | Beaujot |
| 8,757,073 | B2 | 6/2014 | Beaujot et al. |
| 8,915,200 | B2 | 12/2014 | Barsi et al. |
| 2015/0319917 | A1 | 11/2015 | Henry et al. |

FOREIGN PATENT DOCUMENTS

DE    102004030240 A1 †    2/2005

OTHER PUBLICATIONS

Examination Report in Australian Patent Application Serial No. 2017200246, dated Apr. 6, 2018.

† cited by third party

*Primary Examiner* — Christopher J. Novosad
(74) *Attorney, Agent, or Firm* — Hovey Williams LLP

(57) ABSTRACT

A mobile air cart includes a metering assembly configured to receive particulate from a tank and to deliver particulate to pneumatic conveying lines. The metering assembly includes wall structure that defines a unitary, common metering chamber. The metering assembly further includes a plurality of meter units. The meter units are configured to meter and separate particulate within the chamber into respective particulate flows corresponding to the conveying lines.

20 Claims, 19 Drawing Sheets

AIR SEEDER HAVING INDIVIDUALLY CONTROLLABLE METERING WHEELS IN COMMON METER BODY

RELATED APPLICATION

This application claims the benefit of U.S. Provisional Application Ser. No. 62/278,317, filed Jan. 13, 2016, entitled AIR SEEDER HAVING INDIVIDUAL MOTORIZED GEARBOX AND METERING WHEEL ASSEMBLIES IN COMMON METER BODY, which is hereby incorporated in its entirety by reference herein.

BACKGROUND

1. Field

The present invention relates generally to air carts and air seeding equipment. More specifically, embodiments of the present invention concern an air cart with a metering assembly that includes independently powered metering wheels in a common meter body.

2. Discussion of Prior Art

It is well known by those of skill in the art that agricultural air carts and air seeding equipment are used to discharge seed and/or fertilizer in a field. In general, an air cart with one or more product tanks (to carry seed and/or fertilizer) is advanced along the field with an air seeding implement having a series of ground-engaging openers. The air cart meters a flow of seed and/or a flow of fertilizer to each opener through pressurized pneumatic conveying lines as the air cart and implement are being advanced. For each tank, the air cart includes a metering device with a series of metering wheels to dispense multiple flows of seed or fertilizer. The dispensed particulate flows are then carried by respective conveying lines to the openers.

Some of the known metering devices have metering wheels on a common shaft so that the wheels rotate with each other at the same speed. Other known metering devices having metering wheels that can be engaged and disengaged independently of the other wheels (e.g., so that particulate flows can be selectively provided to the openers). Some known metering devices have metering wheels with a flow rate that can be adjusted independently of the other wheels.

However, conventional air carts and metering devices have a number of deficiencies. For instance, metering devices with metering wheels on a common shaft are limited to discharging particulate flows at the same material flow rate. That is, such devices generally do not permit the metering wheels to be engaged, disengaged, or adjusted independently of the other wheels.

Prior art metering devices with independent metering wheels are mechanically complex and prone to mechanical failure. For instance, these devices have a series of pressurized metering bodies that each contain a meter wheel to dispense a respective flow of granular material. Each meter wheel is driven by a dedicated transmission mounted outside of the meter body. The pressurized metering bodies of these known devices are prone to leakage of pressurized air, which can impact the operability of the air cart. Furthermore, the exposed transmissions experience harsh environmental conditions that exacerbate failure of transmission components.

SUMMARY

The following brief summary is provided to indicate the nature of the subject matter disclosed herein. While certain aspects of the present invention are described below, the summary is not intended to limit the scope of the present invention.

Embodiments of the present invention provide an air cart that does not suffer from the problems and limitations of the prior art seeding equipment set forth above.

The present invention concerns a mobile air cart that broadly includes a tank configured to contain particulate, a pressurized air source, a plurality of pneumatic conveying lines, and a metering assembly. The pneumatic conveying lines are fluidly coupled to the pressurized air source, such that an air stream is provided within each conveying line. The metering assembly is configured to receive particulate from the tank and is coupled to the pneumatic conveying lines so as to deliver particulate thereto. The metering assembly broadly includes wall structure and a plurality of meter units. The wall structure defines a unitary, common metering chamber, an inlet through which particulate from the tank enters the common metering chamber, and an outlet through which metered particulate exits the common metering chamber and moves toward the conveying lines. The meter units are configured to meter and separate particulate within the common metering chamber into respective particulate flows corresponding to the conveying lines. Each of the meter units includes a rotatable metering wheel, with rotation of the metering wheel serving to meter the respective particulate flow. The meter units include independently controllable drives for powering the metering wheels, such that each metering wheel is selectively and individually rotatable. Each of the meter units includes a frame that projects into the common metering chamber. The frames support the metering wheels within the common metering chamber.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 2:
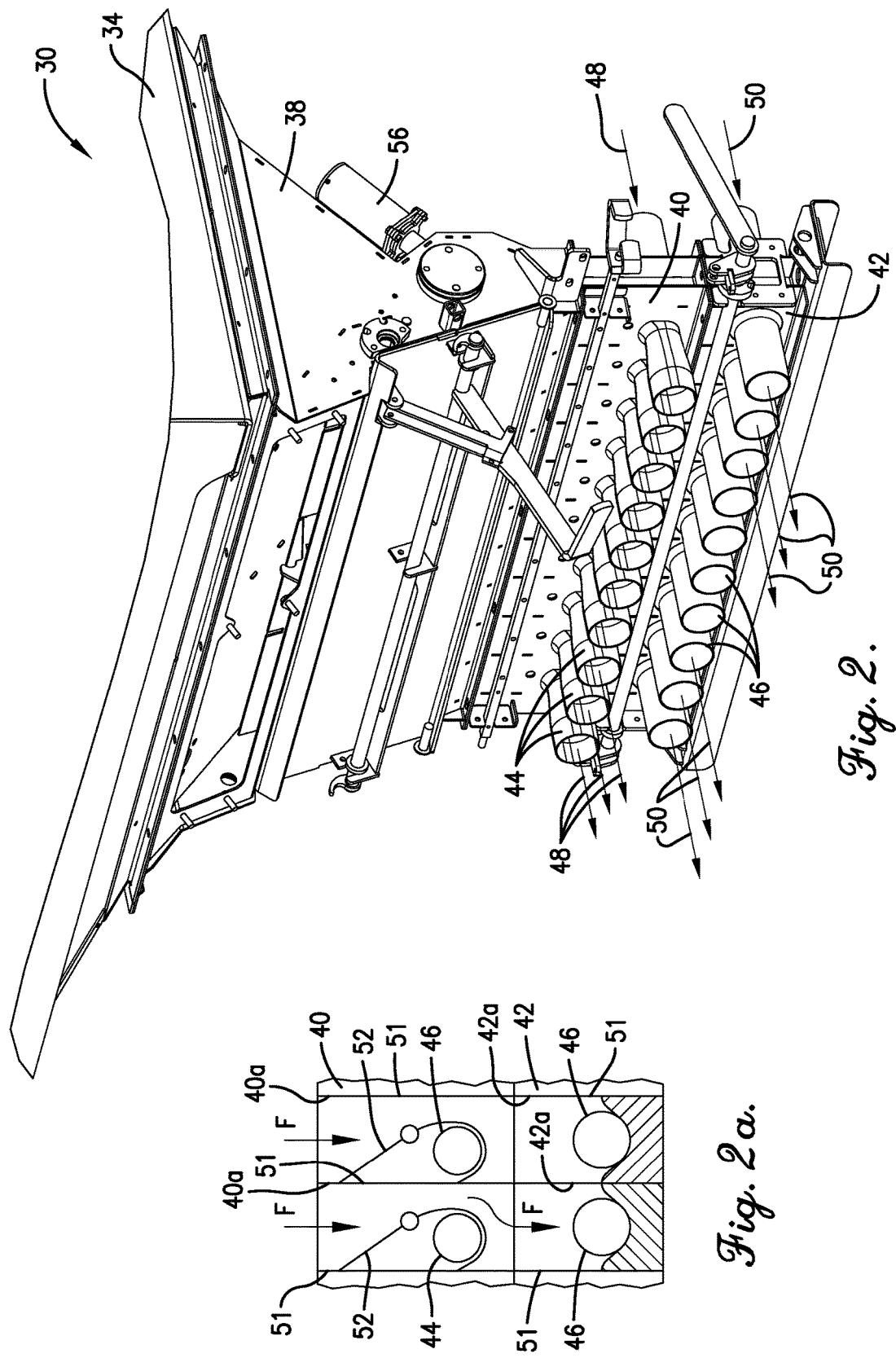
FIG. 2 is a fragmentary front perspective of the air cart shown in FIG. 1, showing a tank, a metering assembly, an upper collector module, a lower collector module, upper conveying lines, and lower conveying lines of the air cart, and showing a meter body of the metering assembly.
Figure 3:
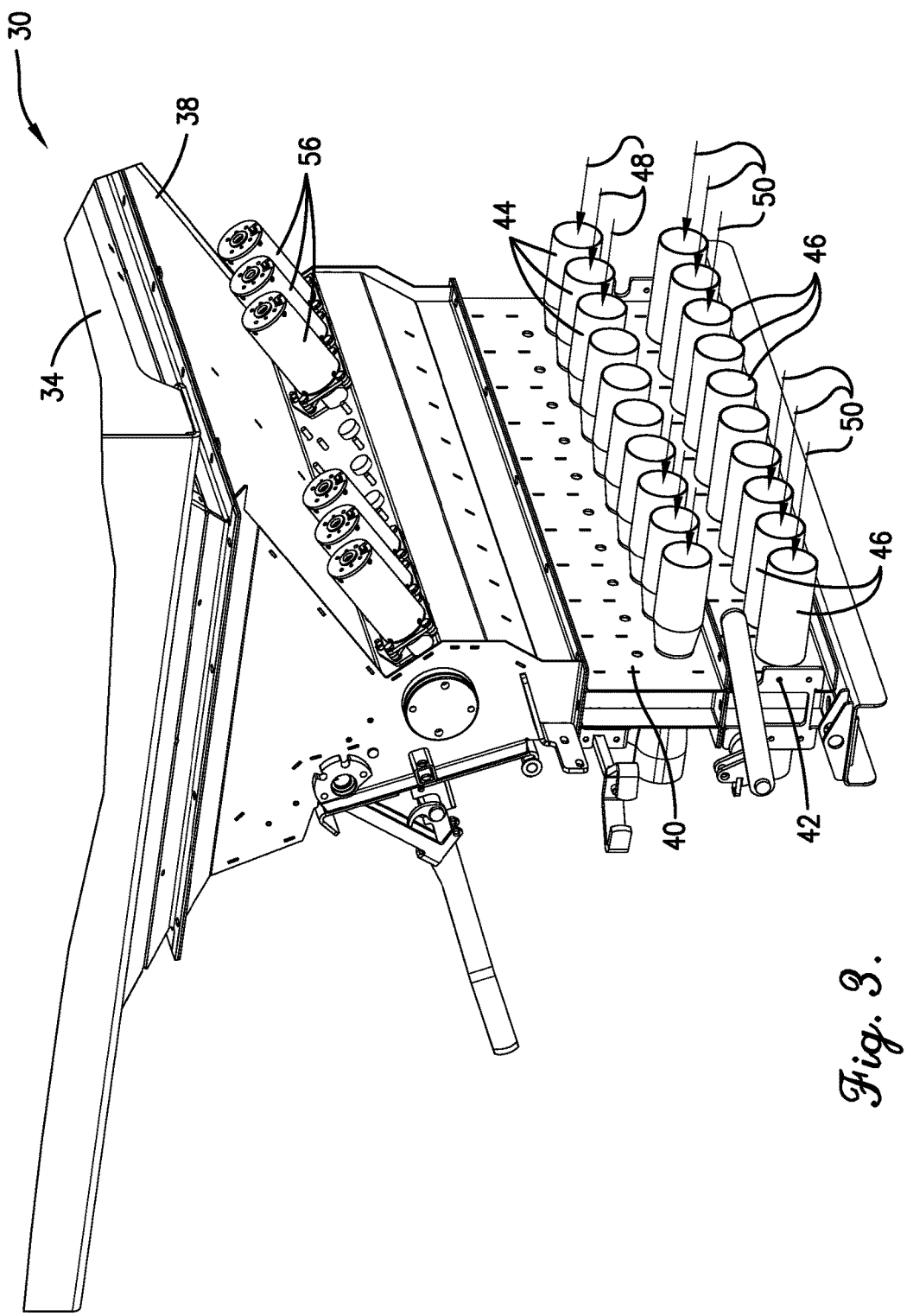
Figure 4:
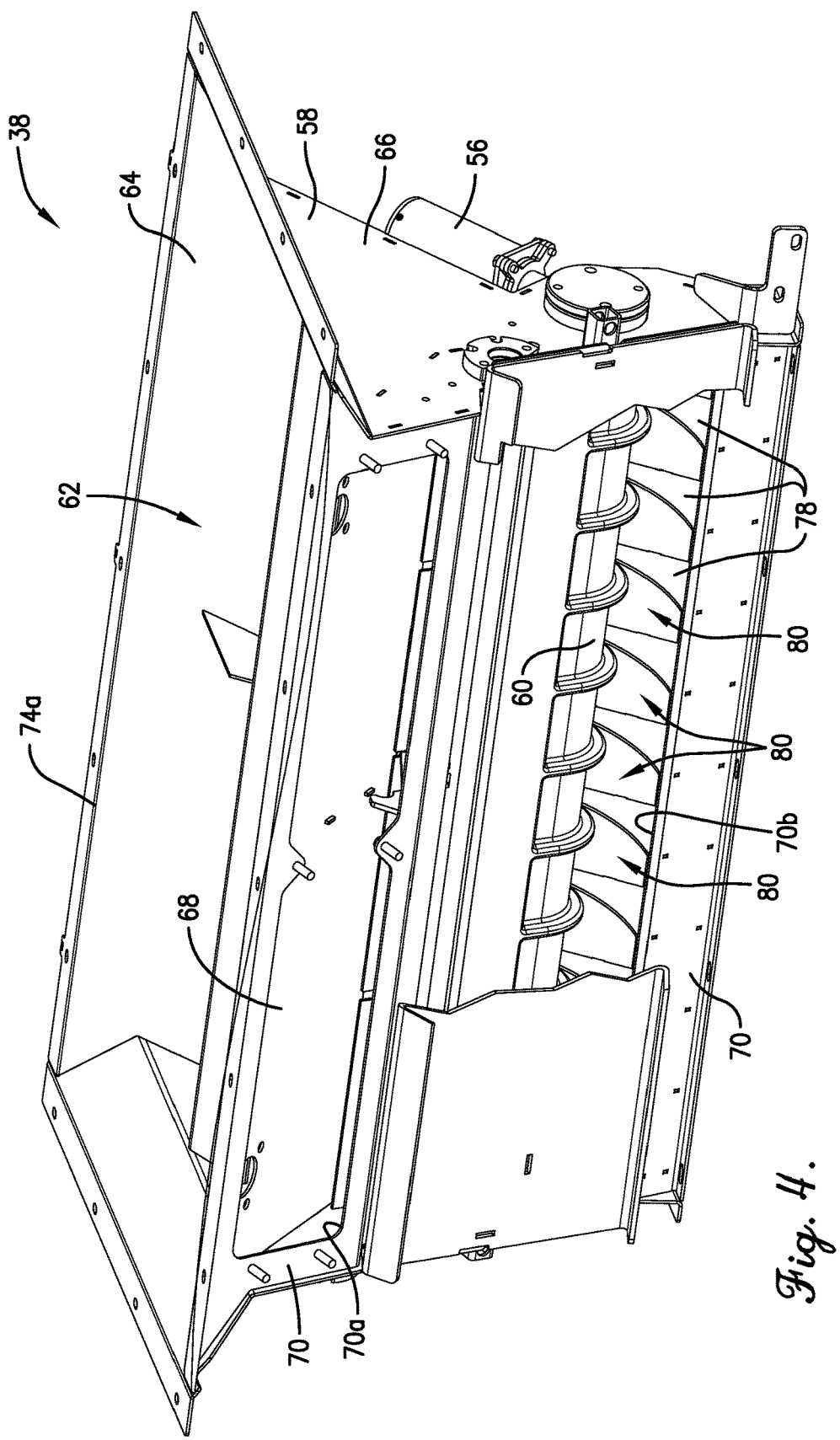
Figure 5:
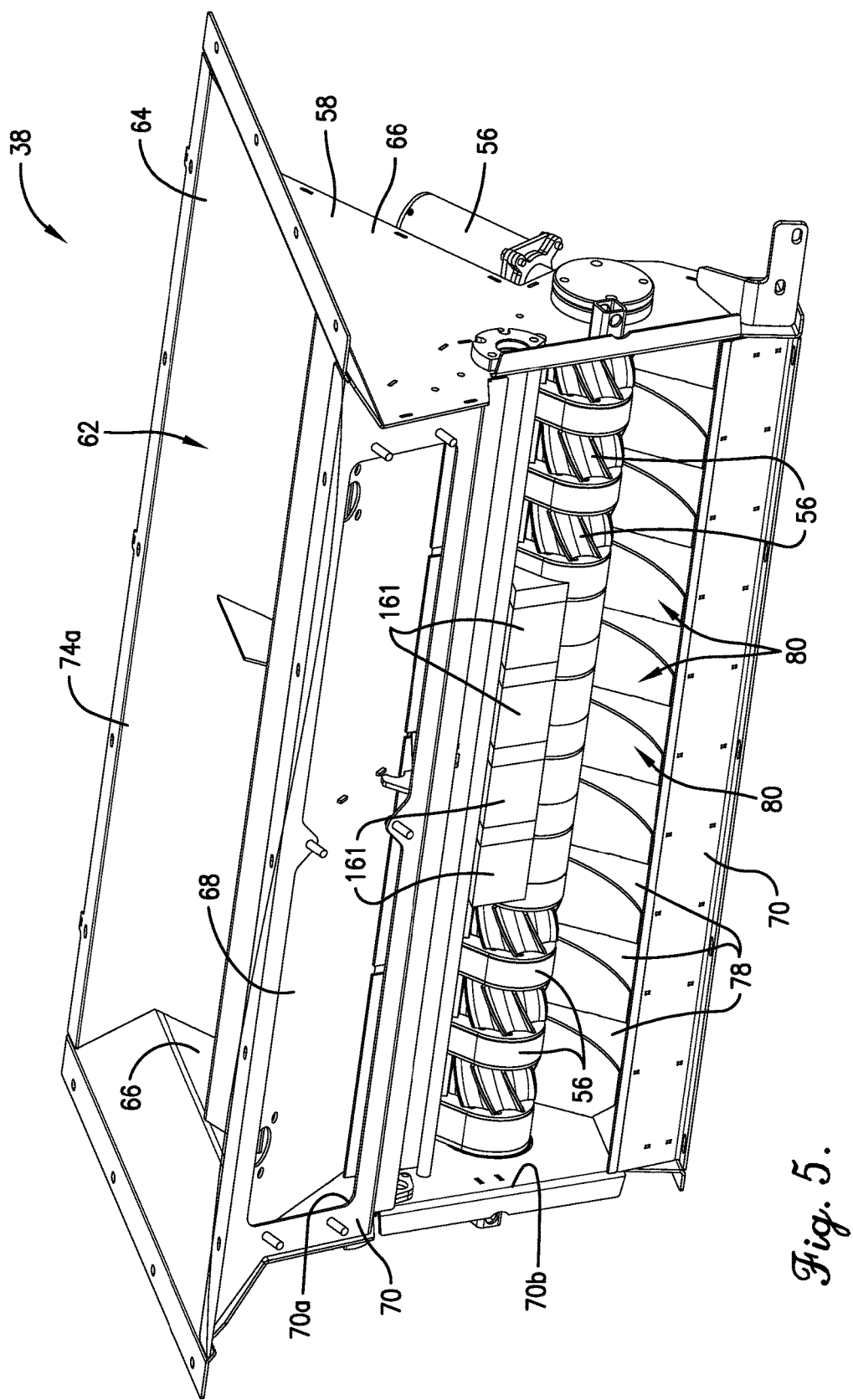
Figure 6:
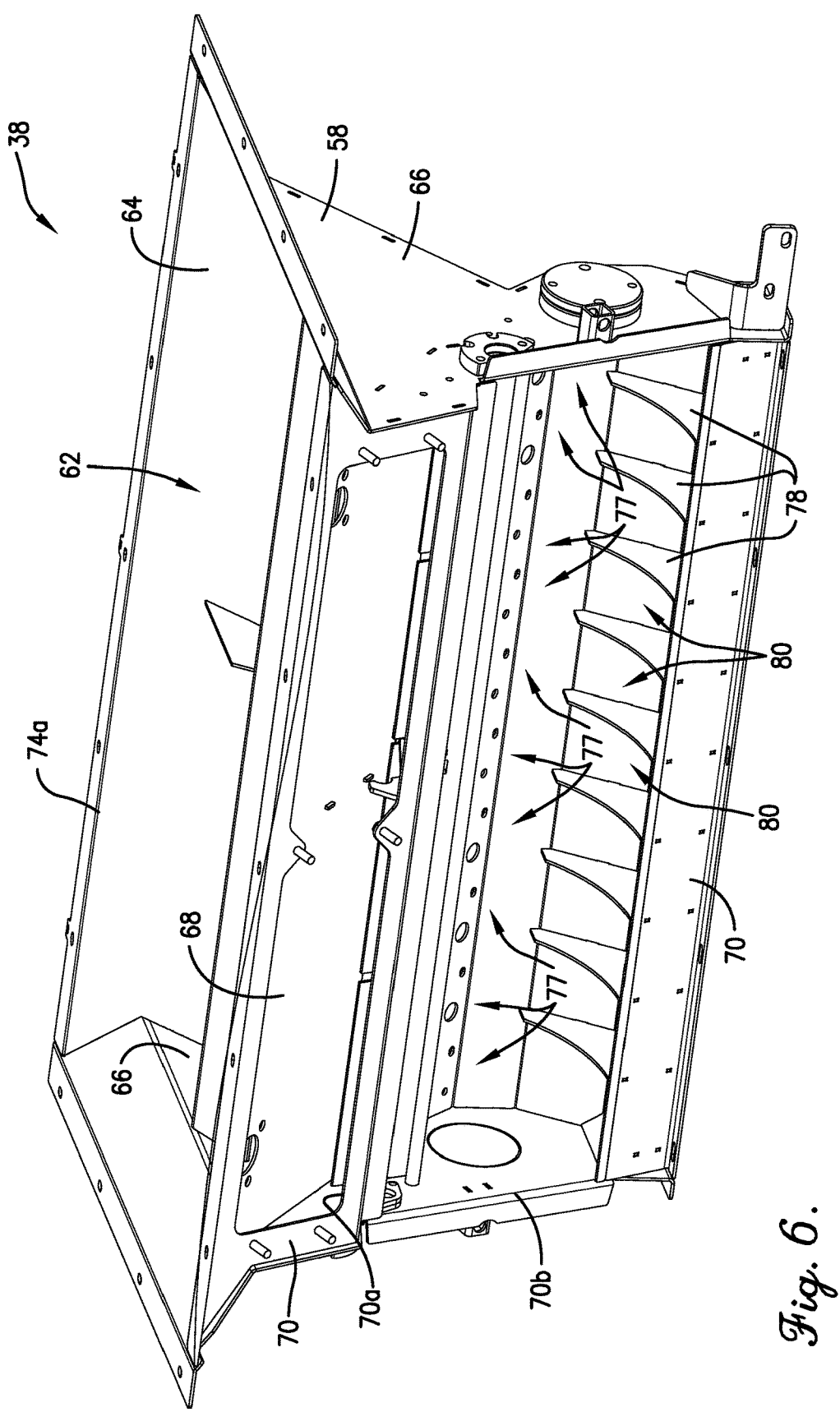
Figure 7:
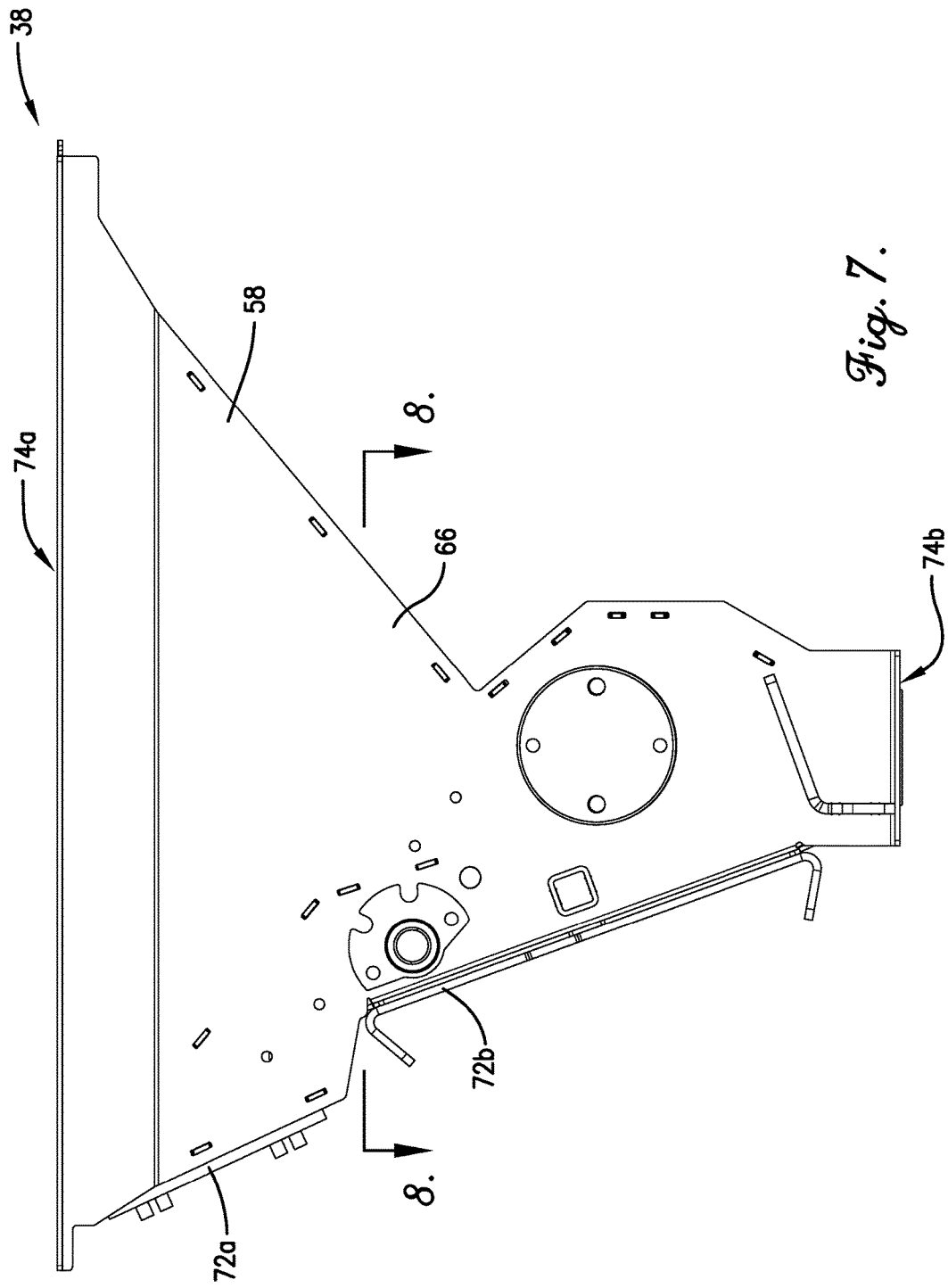
Figure 8:
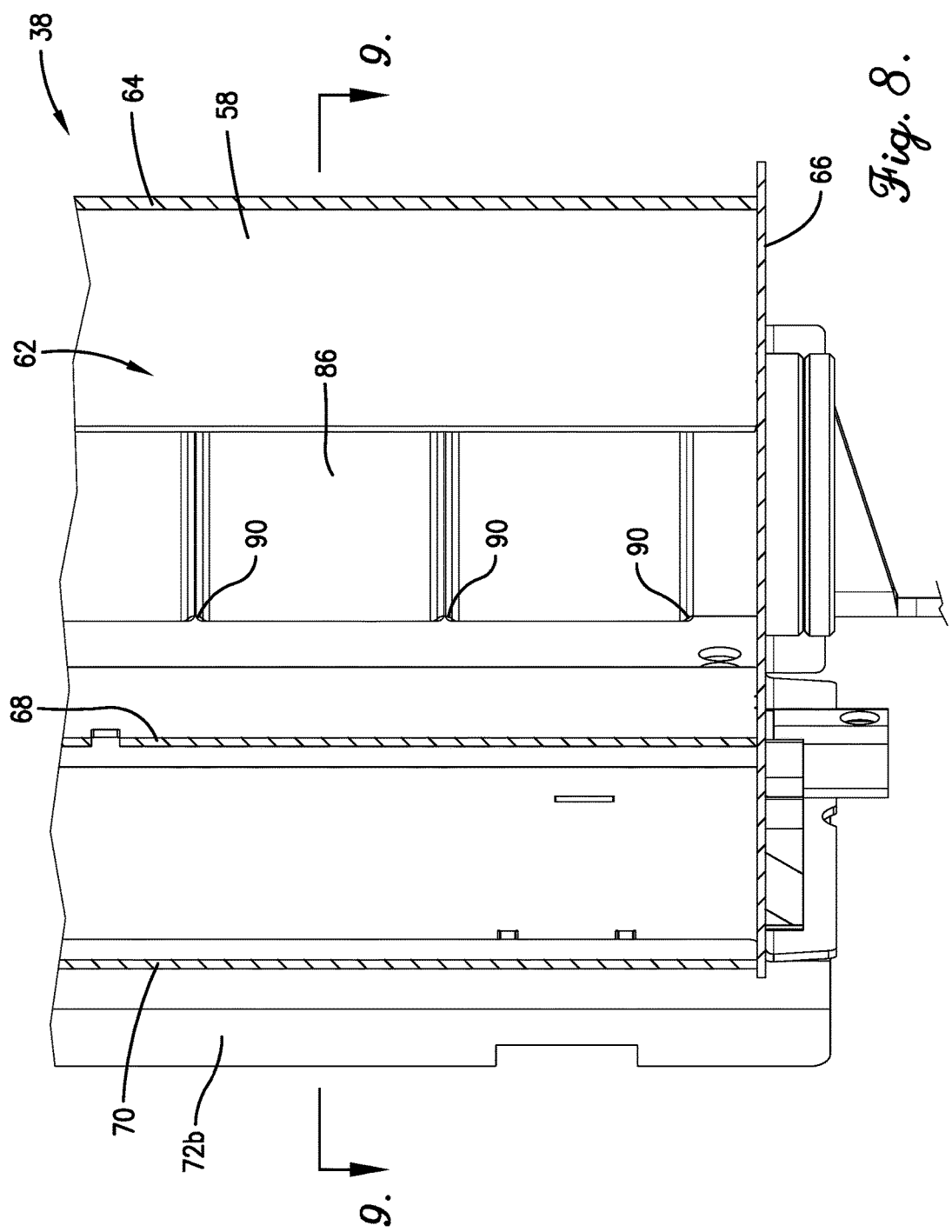
Figure 9:
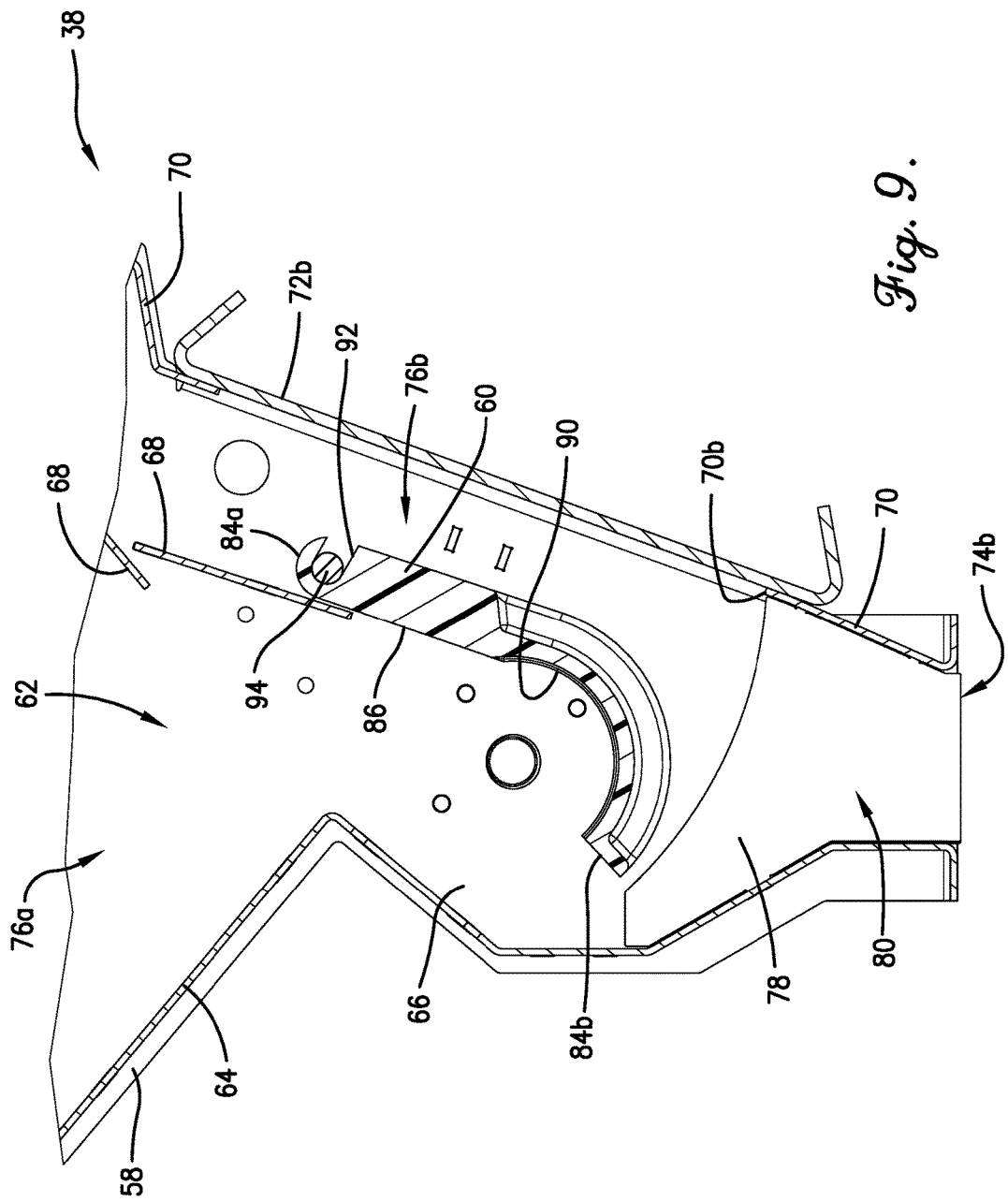
Figure 10:
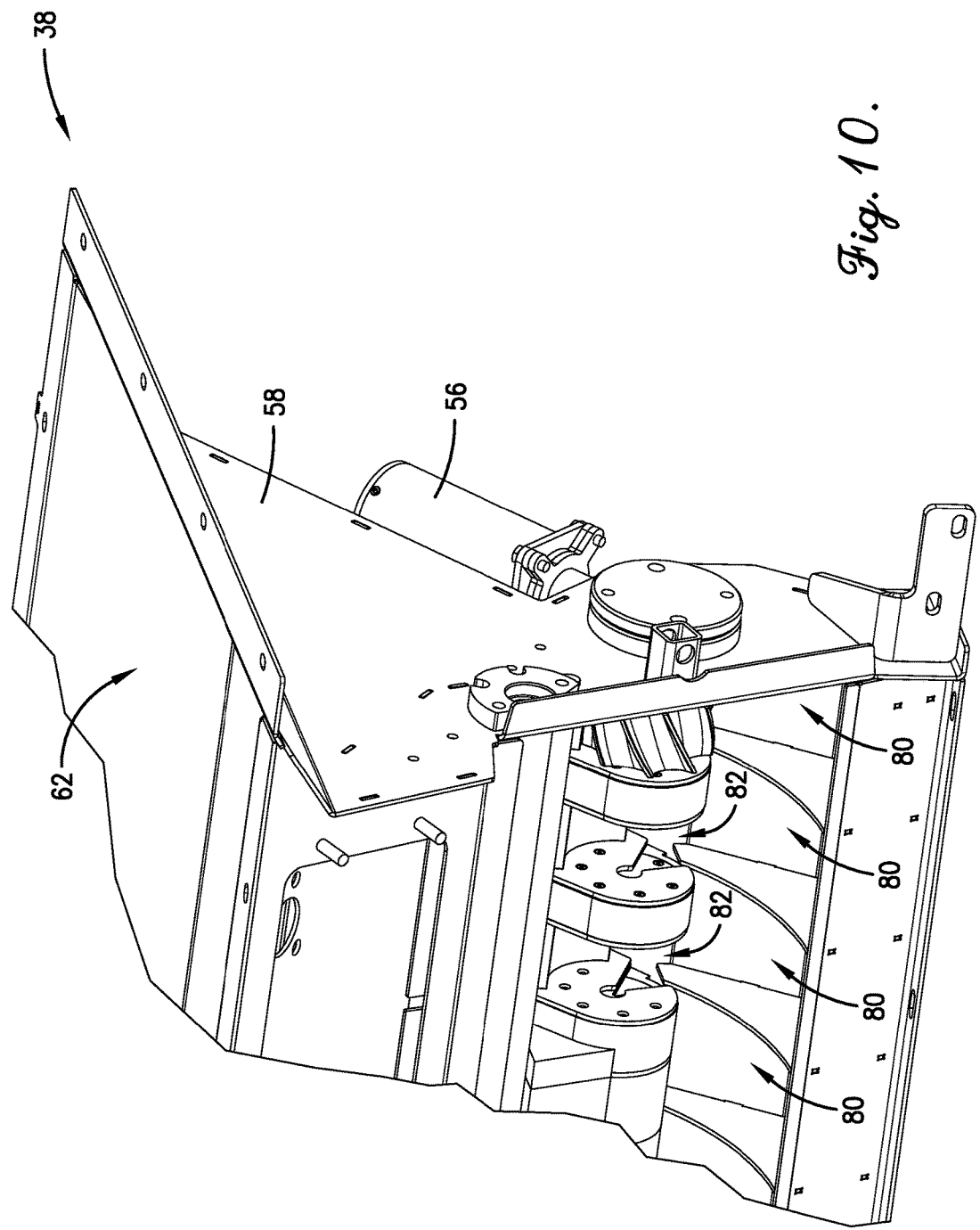
Figure 11:
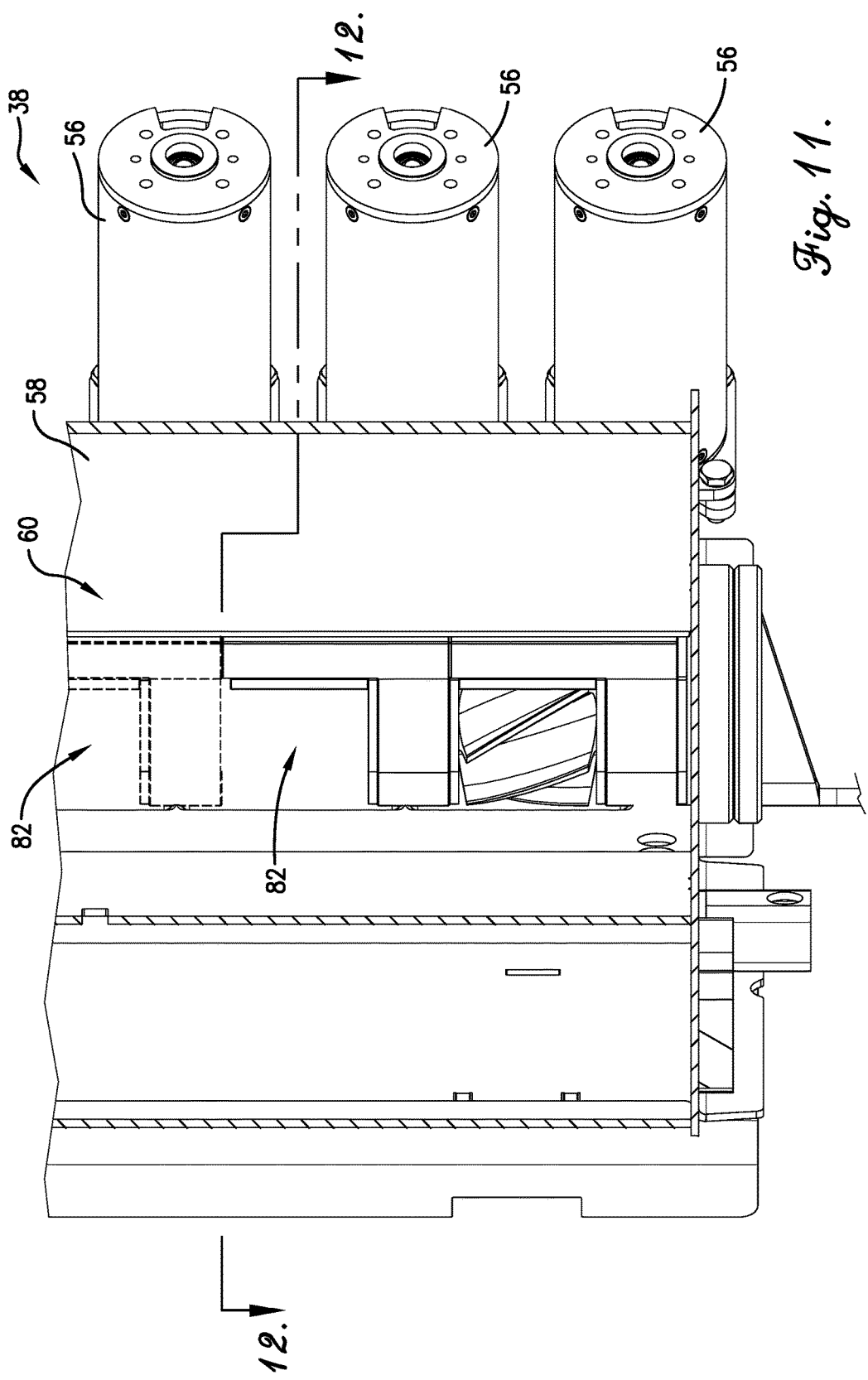
Figure 12:
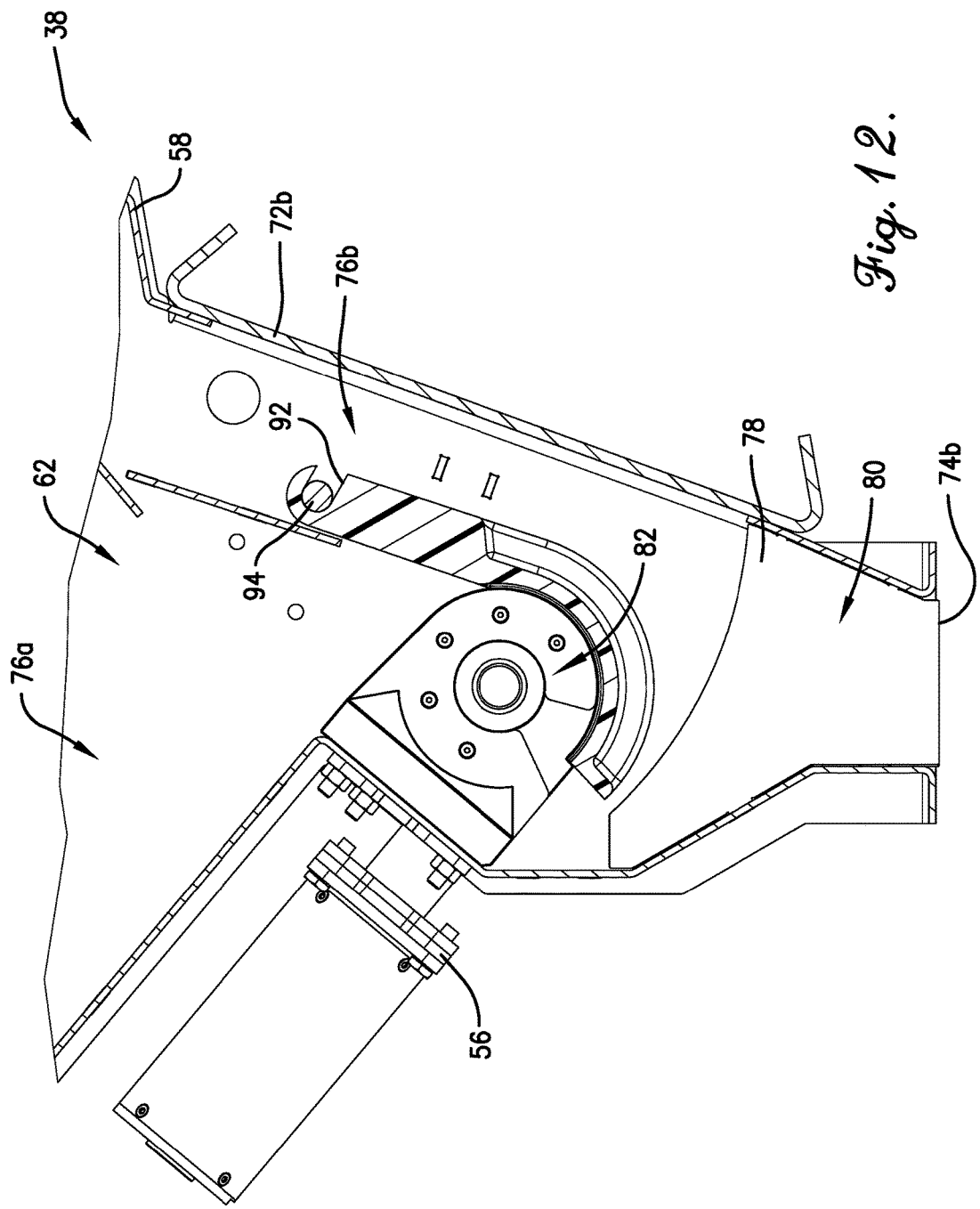
Figure 13:
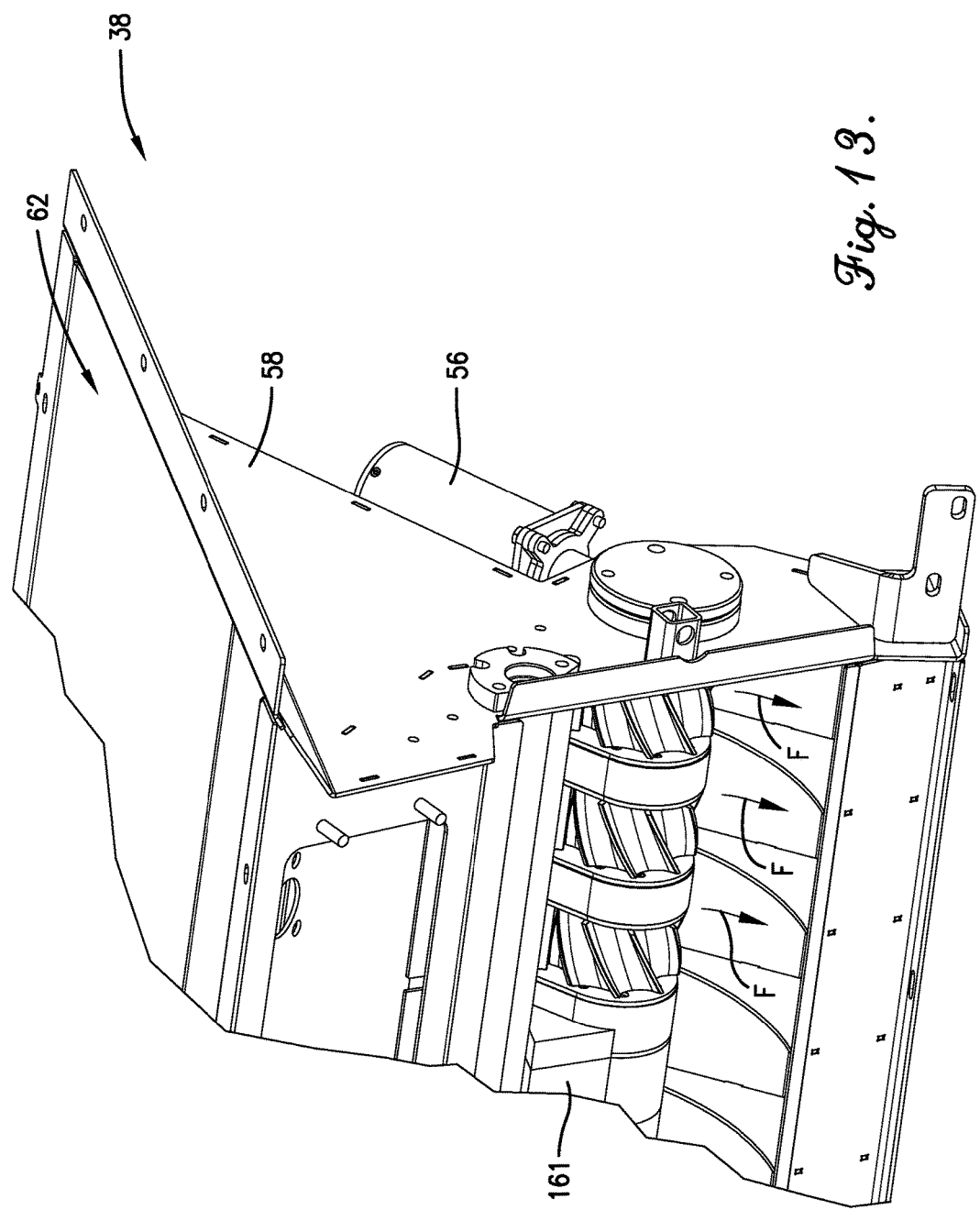
Figure 14:
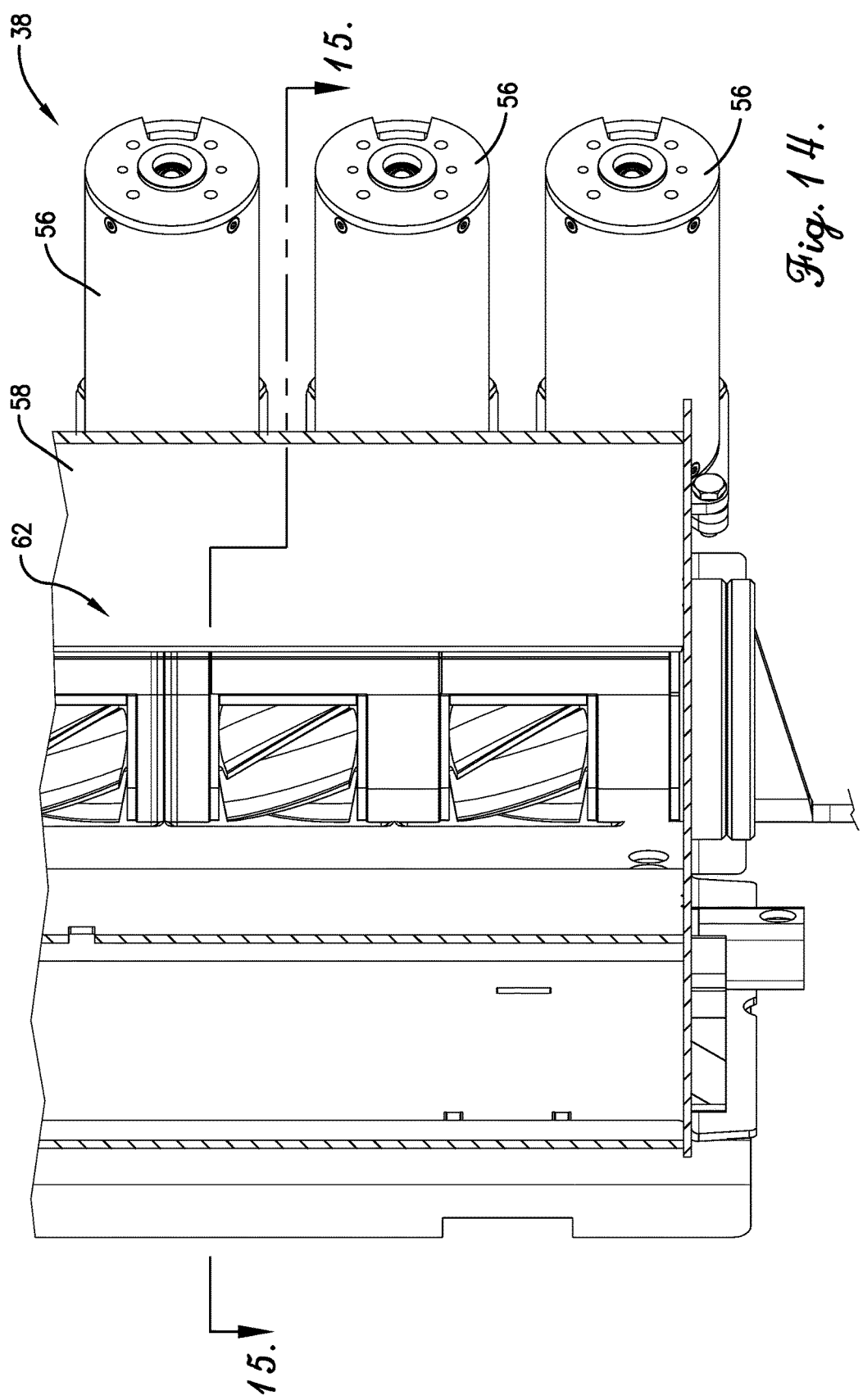
Figure 15:
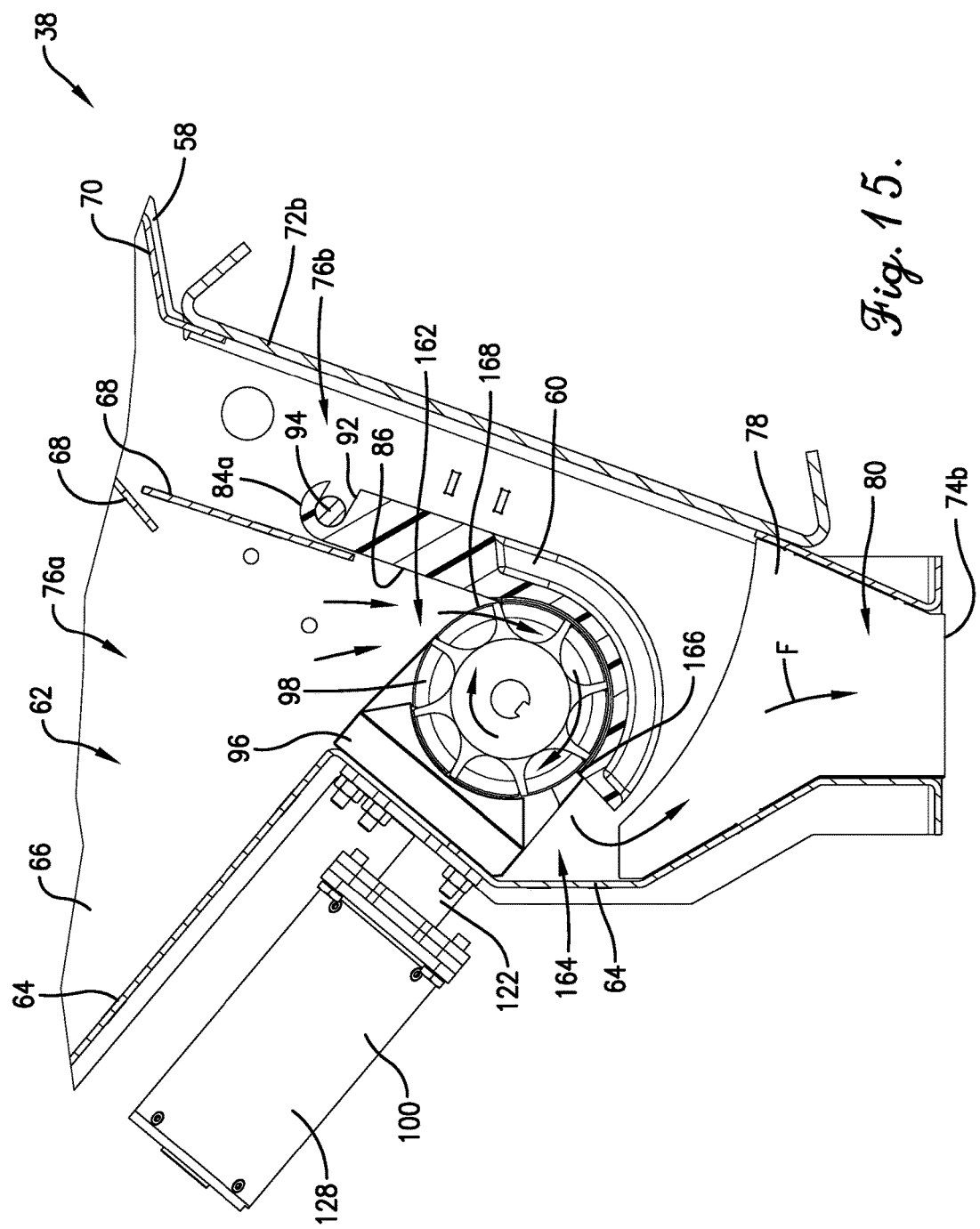
Figure 16:
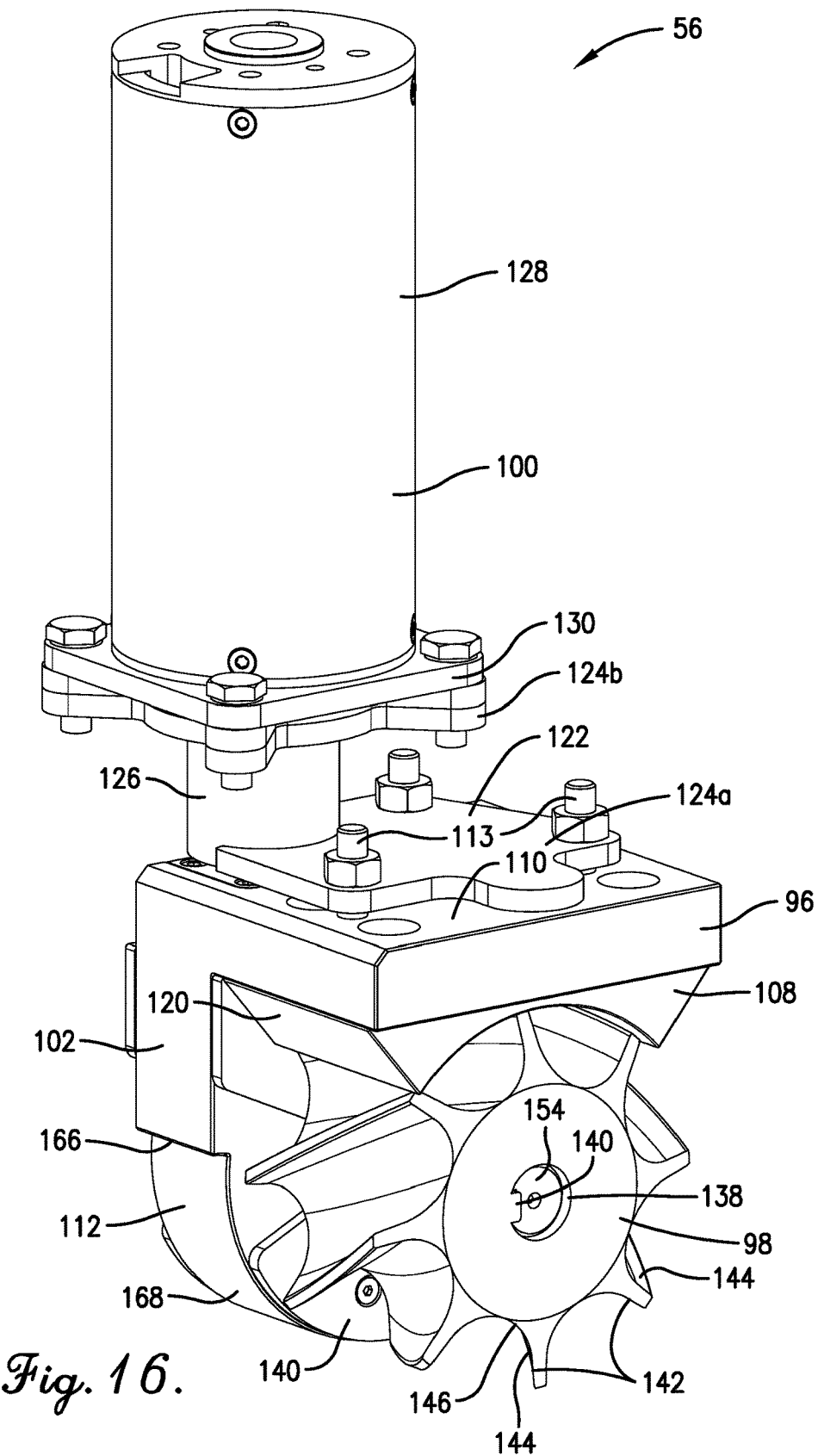
Figure 17:
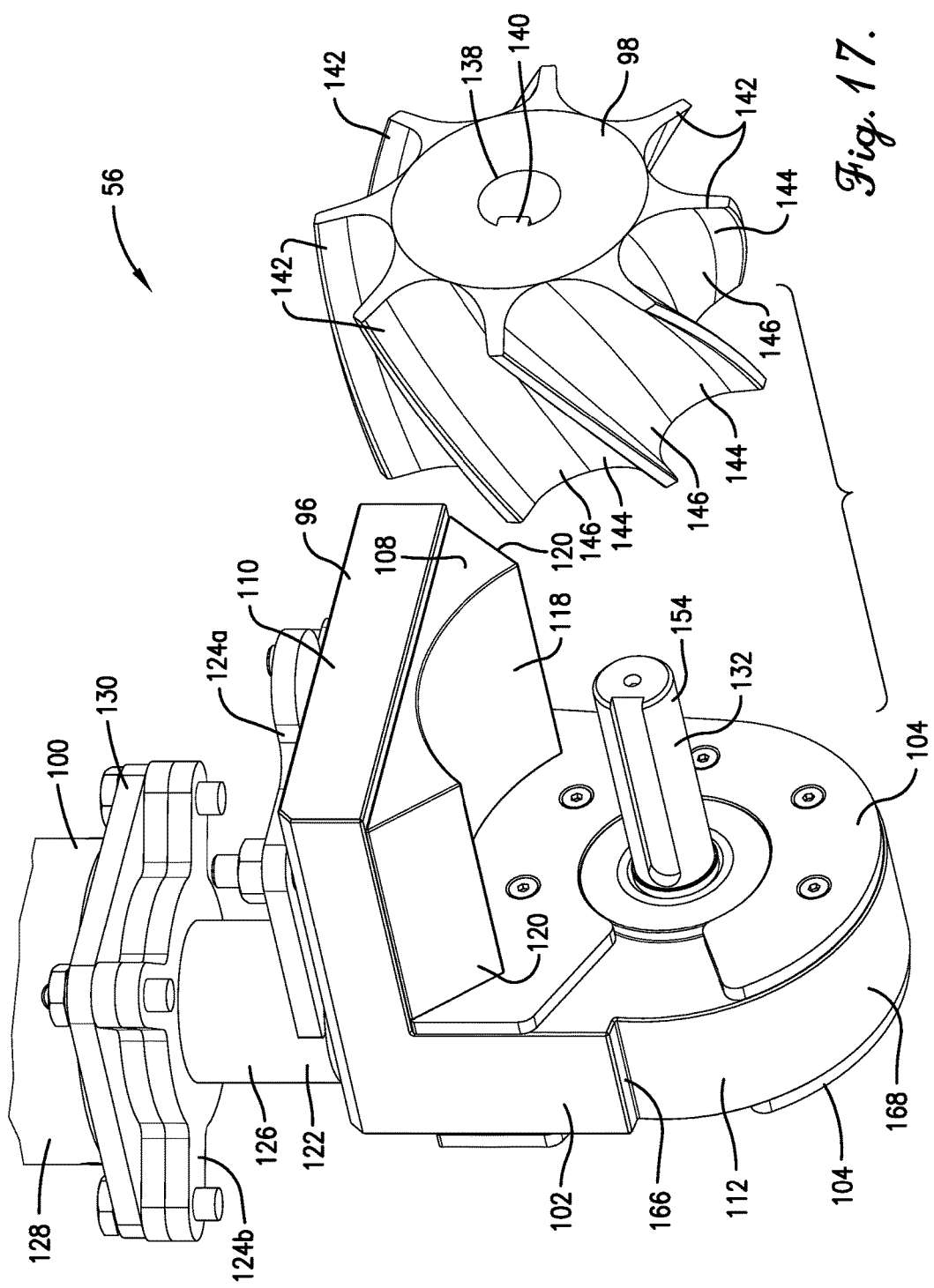
Figure 18:
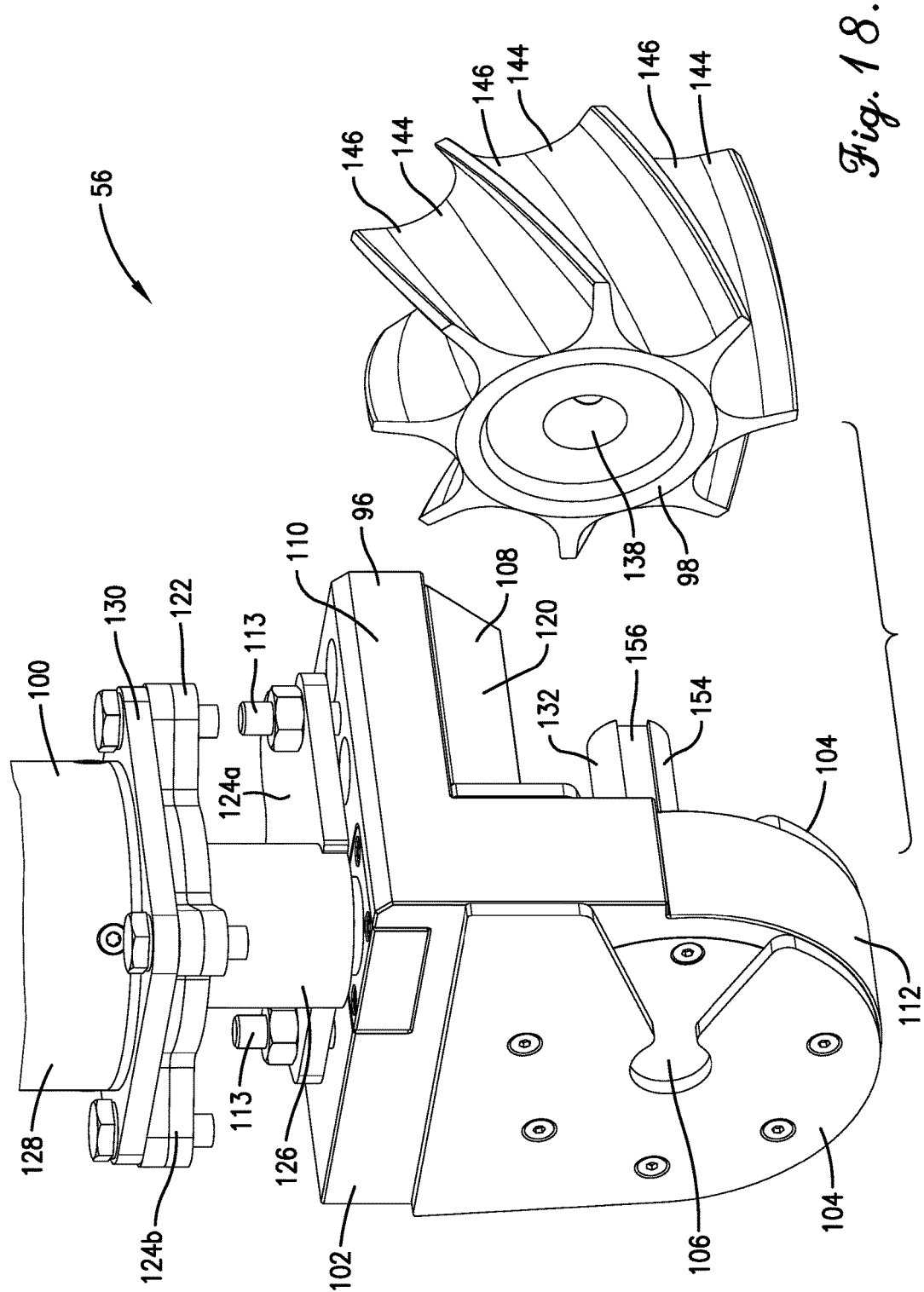
Figure 19:
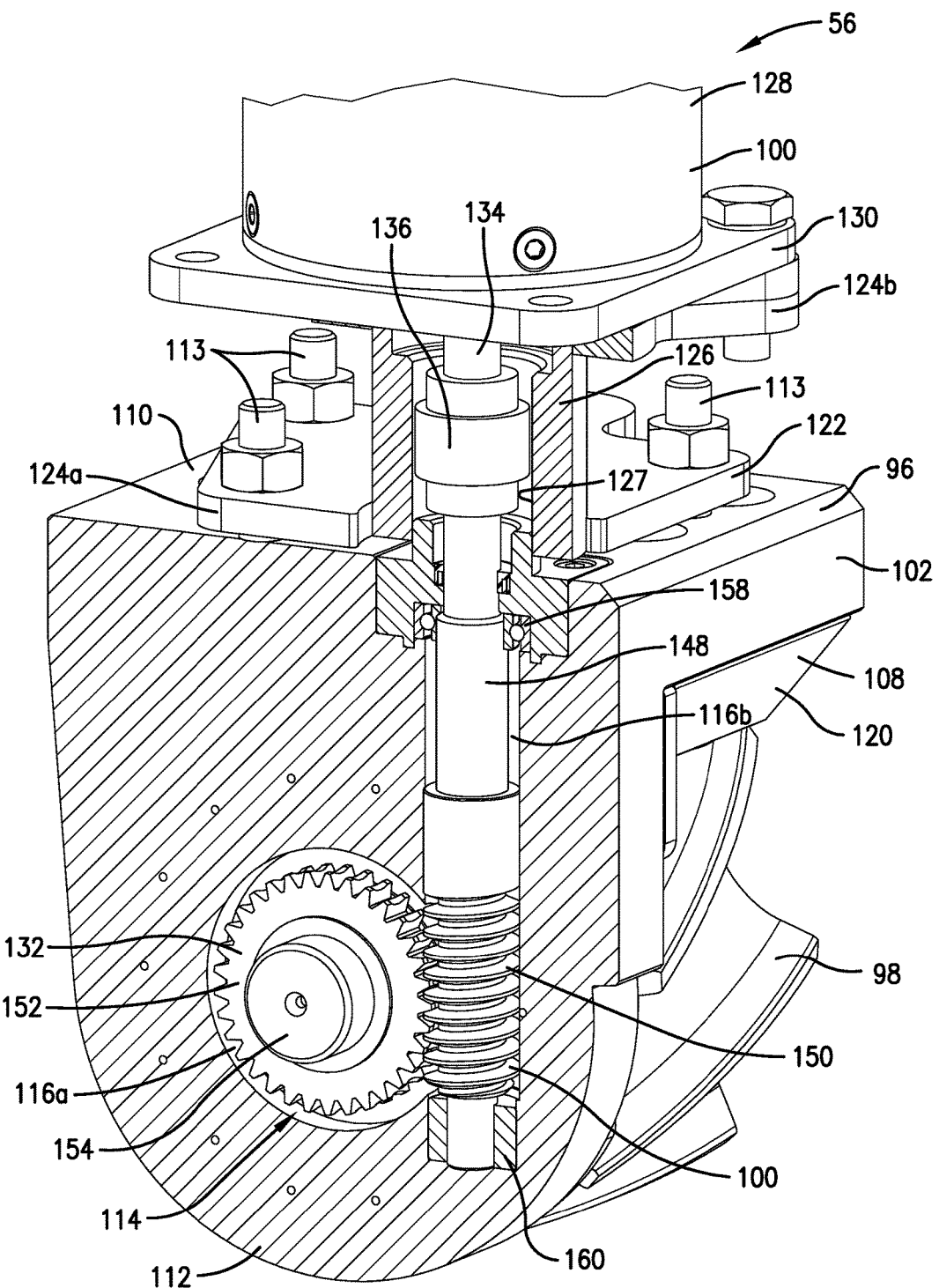

FIG. 2*a* is a fragmentary cross section of the upper and lower collector modules shown in FIG. 2, showing partitions of the modules and module compartments defined by the partitions, and also showing diverter valves shiftably mounted in the upper collector module;

FIG. 3 is a fragmentary rear perspective of the air cart similar to FIG. 2, but taken from an aft side of the metering assembly;

FIG. 4 is a fragmentary perspective of the metering assembly shown in FIGS. 2 and 3, showing a lower door of the meter body broken away to depict a unitary, common chamber of the meter body and a particulate plate mounted in the chamber above outlet passages of the meter body;

FIG. 5 is a fragmentary perspective of the metering assembly similar to FIG. 4, but showing the particulate plate removed from the chamber to depict the meter units and spacers located in the chamber;

FIG. 6 is a fragmentary perspective of the metering assembly similar to FIG. 5, but showing the meter units and spacers removed from the chamber to depict the meter body and the chamber;

FIG. 7 is a side elevation of the metering assembly shown in FIGS. 2-5, showing upper and lower doors of the meter body mounted in sealing engagement with a front wall of the meter body;

FIG. 8 is a fragmentary cross section of the metering assembly taken along line 8-8 in FIG. 7, showing the particulate plate mounted in the chamber and presenting a guide surface with a series of sealing ridges;

FIG. 9 is a fragmentary cross section of the metering assembly taken along line 9-9 in FIG. 8, showing a supply section and an air flow section of the chamber separated by the particulate plate and inner front walls;

FIG. 10 is a fragmentary perspective of the metering assembly shown in FIGS. 2-9, showing a pair of metering wheels removed from corresponding meter units to depict frames of the meter units, with the frames defining chamber sections to receive the metering wheels;

FIG. 11 is a fragmentary top view of the metering assembly shown in FIG. 10, showing chamber sections defined by the particulate plate and corresponding frames of the meter units;

FIG. 12 is a fragmentary cross section of the metering assembly taken along line 12-12 in FIG. 11, showing one of the meter units mounted on the meter body without the corresponding meter wheel, with the frame located in the chamber rearwardly of the particulate plate;

FIG. 13 is a fragmentary perspective of the metering assembly similar to FIG. 10, but showing the meter wheels supported by the frames and mounted within corresponding chamber sections;

FIG. 14 is a fragmentary top view of the metering assembly shown in FIG. 13, showing the metering wheels supported by the frames and mounted within corresponding chamber sections;

FIG. 15 is a fragmentary cross section of the metering assembly taken along line 15-15 in FIG. 14, showing one of the meter units mounted on the meter body, with the frame and particulate plate defining a chamber section that receives the corresponding meter wheel;

FIG. 16 is a perspective of one of the meter units shown in FIGS. 2-5, showing a frame, meter wheel, transmission, and motor of the meter unit;

FIG. 17 is a fragmentary perspective of the meter unit shown in FIG. 16, showing the meter wheel exploded away from an output shaft of the transmission;

FIG. 18 is a fragmentary perspective of the meter unit similar to FIG. 17, but taken from the opposite side of the meter unit; and FIG. 19 is a fragmentary partly sectioned perspective of the meter unit shown in FIGS. 16-18, showing the output shaft, driven gear, worm, and input shaft of the transmission located within a compartment of the frame, with the input shaft being coupled to a shaft of the motor.

The drawing figures do not limit the present invention to the specific embodiments disclosed and described herein.

The drawings are not necessarily to scale, emphasis instead being placed upon clearly illustrating the principles of the preferred embodiment.

DETAILED DESCRIPTION OF THE PREFERRED EMBODIMENTS

Figure 1:
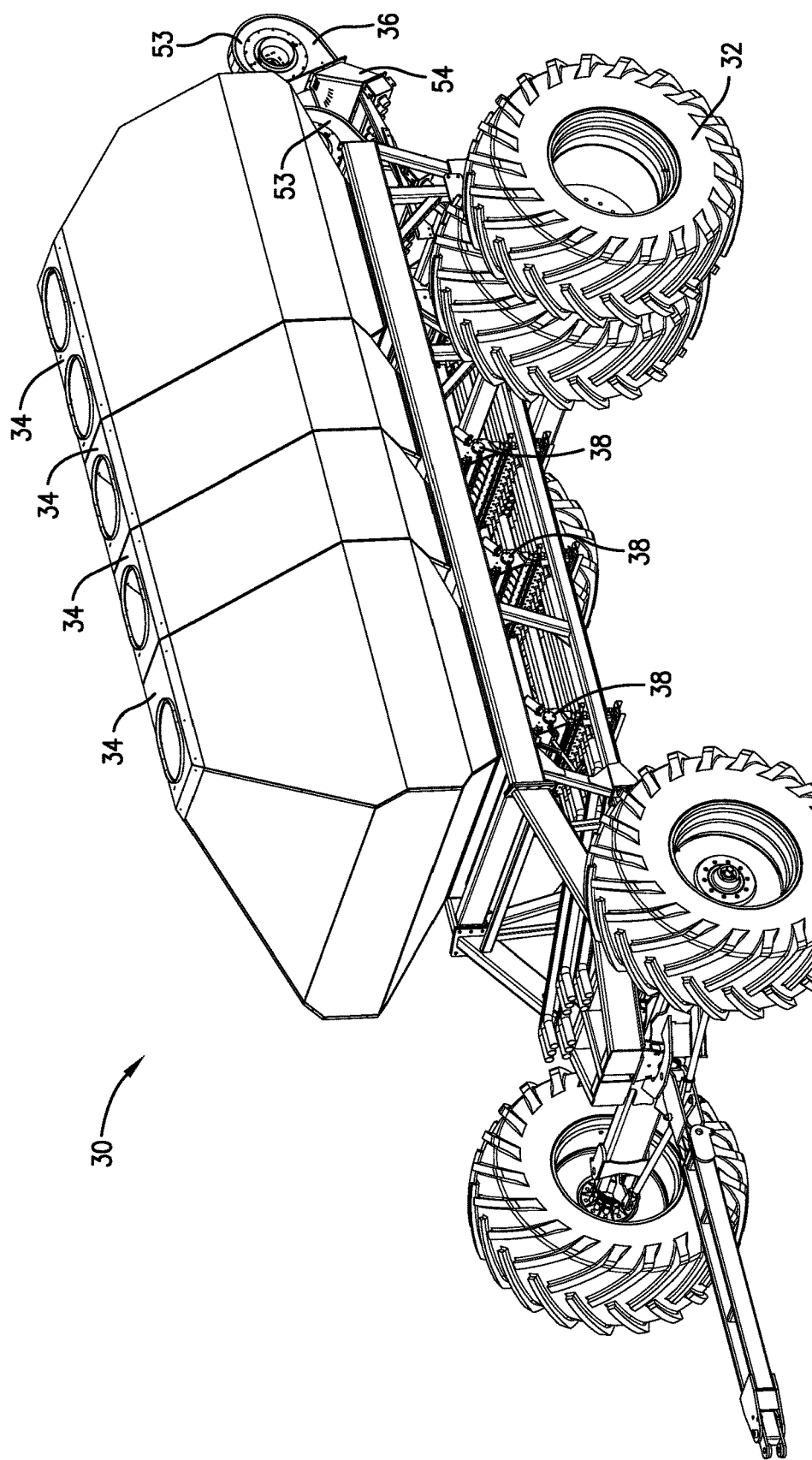
FIG. 1 is a front perspective of an air cart constructed in accordance with a preferred embodiment of the present invention.

Turning initially to FIG. 1, an air cart 30 is configured to be drawn behind a self-propelled tractor (not shown) along with a planter (not shown) having a series of openers. As is customary, the air cart 30 supplies seed and/or fertilizer (in granular form) to the planter while the planter and air cart 30 are drawn across a field. The air cart 30 preferably includes, among other things, a rolling cart chassis 32, tanks 34, a pneumatic conveying system 36, and metering assemblies 38. As will be explained, each metering assembly 38 is preferably configured to meter corresponding particulate flows F independently of one another (see FIGS. 13 and 15).

The illustrated air cart 30 preferably includes four (4) product tanks 34 mounted on the cart chassis 32. Each tank 34 is operable to contain a particulate material (generally, seed or granular fertilizer) for distribution to the planter. Each of the tanks 34 is sealed and pressurized by the conveying system 36 during use of the air cart 30. Each tank 34 presents a lowermost tank outlet (not shown) that fluidly communicates with a corresponding metering assembly 38.

Turning to FIGS. 1-3, the conveying system 36 is operable to collect seed and/or fertilizer from the tanks 34, via the metering assemblies 38, and convey the particulate material to the planter with multiple pressurized air streams. The illustrated conveying system 36 includes upper and lower collector modules 40,42 and upper and lower pneumatic conveying lines 44,46. The upper and lower conveying lines 44,46 transmit corresponding upper and lower pressurized air streams 48,50.

In the usual manner, the upper collector modules 40 are fluidly connected to one another by upper conveying lines 44. Similarly, the lower collector modules 42 are fluidly connected to one another by lower conveying lines 46. The illustrated air cart embodiment includes ten (10) upper conveying lines 44 and ten (10) lower conveying lines 46. However, the air cart 30 could have an alternative number of conveying lines 44,46 (e.g., depending on the configuration of the metering assembly 38 or the number of openers associated with the planter).

Turning to FIG. 2a, the upper collector module 40 preferably presents a series of upper module compartments 40a that are each sealed from one another and separated by corresponding partitions 51. The upper module compartments 40a fluidly communicate with corresponding ones of the upper conveying lines 44.

Similarly, the lower collector module 42 preferably presents a series of lower module compartments 42a that are each sealed from one another and separated by corresponding partitions 51. The lower module compartments 42a fluidly communicate with corresponding ones of the lower conveying lines 46. The lower module compartments 42a fluidly communicate with corresponding ones of the upper module compartments 40a. Additional details of the module compartments are disclosed in U.S. Pat. No. 8,915,200, issued Dec. 23, 2014, entitled SEEDER WITH METERING SYSTEM HAVING SELECTIVELY POWERED METERING SECTIONS, which is hereby incorporated in its entirety by reference herein.

The collector modules 40,42 fluidly communicate with a corresponding metering assembly 38 to receive flows F of granular material from the metering assembly 38. The upper module compartments 40*a* of the upper module 40 fluidly communicate with upper conveying lines 44 to discharge granular material to the upper conveying lines 44. Similarly, the lower module compartments 42*a* of the lower modules 42 fluidly communicate with lower conveying lines 46 to discharge granular material to the lower conveying lines 46.

In the illustrated embodiment, the collector modules 40,42 present a series often (10) module compartments 40*a*,42*a*, respectively. However, the collector modules 40,42 could have an alternative number of compartments 40*a*,42*a* (e.g., depending on the configuration of the metering assembly 38 or the number of openers associated with the planter).

The conveying system 36 also preferably includes a series of diverter valves 52 installed in the upper collector module 40 (see FIG. 2). Each diverter valve 52 is swingable between discrete positions to selectively control whether the respective particulate flow F is discharged into the corresponding upper conveying line 44, the corresponding lower conveying line 46, or both. Additional features of the diverter valves 52 and their operation are disclosed in the above-incorporated '200 patent.

Turning again to FIG. 1, the illustrated conveying system 36 also includes a pair of powered fans 53 and upper and lower manifolds 54. Each fan 53 provides a pressurized air source that distributes pressurized air to one of the manifolds 54. It will be understood that an alternative fan configuration could provide pressurized air to manifolds 54 without departing from the principles of the present invention. For instance, the air cart could have a single fan that provides pressurized air to both manifolds 54. The upper manifold 54 is fluidly coupled to upper conveying lines 44 to discharge pressurized air streams 48 therein. Similarly, lower manifold 54 is fluidly coupled to lower conveying lines 46 to discharge pressurized air streams 50 therein.

In the usual manner, the air streams 48,50 carry granular material through the conveying lines 44,46 and to a series of openers (not shown) associated with the planter. It will be appreciated that pressurized air from the air streams 48,50 also pressurizes the tanks 34 and the metering assembly 38. However, because the tanks 34 and the metering assembly 38 are both preferably sealed, air from the air streams 48,50 is restricted from leaking out of the tanks 34 and the metering assembly 38.

Turning to FIGS. 4-15, the metering assembly 38 is operable to receive a supply of particulate material from the corresponding tank 34 and provide separate particulate flows F (see FIGS. 13 and 15) that are discharged to the respective conveying lines 44,46.

As will be discussed, the metering assembly 38 includes meter units 56 that are installed in a common meter body 58 and are operable independently of one another to meter corresponding particulate flows F. That is, the meter units 56 are independently operable so that the flow rate of each particulate flow F can be controlled independently of the other particulate flows F. Each particulate flow F can be independently turned on and turned off more preferably, the flow rate of each particulate flow F can be independently varied. The metering assembly 38 broadly includes the meter body 58, meter units 56, and a particulate plate 60 (see FIGS. 13-15).

Turning to FIGS. 4-10, the meter body 58 preferably provides a sealed wall structure that can be pressurized during air cart operation. The meter body 58 preferably presents a unitary chamber 62 that receives the meter units 56. In particular, the illustrated meter body 58 preferably includes a rear wall 64, side walls 66, inner front wall 68, outer front wall 70, and removable upper and lower walls 72*a,b* (see FIGS. 7-9).

The outer front wall 70 preferably presents upper and lower access openings 70*a,b* (see FIG. 4) which are preferably sealed closed by corresponding walls 72*a,b* (see FIGS. 7 and 9). The removable walls 72*a,b* comprise doors that are selectively removable from the outer front wall 70 to permit access to the chamber 62 via the openings 70*a,b*.

The walls cooperatively form the chamber 62, which is configured to be pressurized by the conveying system 36 to a gauge pressure above ambient pressure. Preferably, the walls are sealingly interconnected to restrict leakage of pressurized air from the chamber 62.

Again referring to FIGS. 4-10, the walls 64,66,68,70,72 cooperatively define an inlet 74*a* and outlet 74*b* of the meter body 58 (see FIG. 7). The wall structure also preferably defines the unitary chamber 62. The chamber 62 includes a particulate supply section 76*a* and an air flow section 76*b* that are separated by the inner front wall 68 (see FIG. 9). The air flow section 76*b* fluidly communicates with a top of the corresponding tank 34 via a pressure hose (not shown). The hose is configured to transfer air between the tank 34 and the air flow section 76*b* to equalize air pressure therebetween.

As will be described, the meter body 58 is configured to receive a series of meter units 56 within the chamber 62. In the illustrated embodiment, the meter body 58 presents a series of ten (10) meter stations 77, all positioned laterally with the chamber 62 along the length of the meter body 58 and each configured to receive a meter unit 56 (see FIGS. 5 and 6). However, the meter body 58 could present an alternative number of meter stations 77. The meter body 58 also preferably includes partitions 78 that define outlet passages 80 spaced along the length of the outlet 74*b* (see FIGS. 5, 6, and 9). Each outlet passage 80 is preferably laterally aligned with, and in fluid communication with, a corresponding upper module compartment 40*a* and a corresponding lower module compartment 42*a* of the collector modules 40,42.

Preferably, the chamber 62 further includes meter chamber sections 82 that communicate with the supply section 76*a* and with corresponding outlet passages 80 (see FIGS. 10-12). As will be explained, the illustrated chamber sections 82 are defined by meter units 56 and the particulate plate 60.

Turning to FIGS. 4, 8, 9, and 15, the illustrated particulate plate 60 includes opposite upper and lower side margins 84*a,b* and a guide surface 86 that extends vertically between the side margins 84 (see FIG. 9). For purposes which will be described, the guide surface 86 includes a curved portion. The guide surface 86 defines a plurality of ridges 90 that are spaced along the length of the guide surface 86 (see FIG. 8).

The upper side margin 84*a* of the particulate plate 60 presents a slot 92 that extends lengthwise along the particulate plate 60 (see FIG. 9). The particulate plate 60 is removably mounted on a rod 94 of the meter body 58 and is operable to be swung into and out of the operating position along the meter units 56 (see FIG. 15). As will be explained, the particulate plate 60 cooperates with each meter unit 56 in the operating position (see FIG. 15) to define a path along which the particulate material moves through the corresponding chamber section 82. The particulate plate 60 can be swung away from the meter units 56 (e.g., to permit access to meter wheels and removal of the particulate plate 60 from the meter body 58).

The illustrated metering assembly 38 preferably has a single particulate plate 60 that extends across multiple chamber sections 82. However, as will be discussed, certain aspects of the present invention contemplate a metering assembly having a plurality of discrete particulate plates, each corresponding with a respective metering unit.

Turning to FIGS. 15-19, meter units 56 are preferably located in the chamber 62 and are operable independently of each other to meter corresponding particulate flows F. Each of the illustrated meter units 56 includes, among other things, a frame 96, a meter wheel 98, and a meter drive 100.

The frames 96 are mounted on the meter body 58 to project into the chamber 62. The frames 92 are positioned in series, and cooperate generally with the plate 60 to define the spaced apart chamber sections 82. Each particulate flow F is generated within a corresponding chamber section 82 and then discharged into the respective outlet passage 80. Each frame 96 is configured to rotatably support the meter wheel 98 within a corresponding chamber section 82. That is to say, the frames project into the common chamber 62 so that preferably all the meter wheels are supported in the same, common chamber 62.

The frame 96 preferably includes an L-shaped bracket 102, wear plates 104, a cover 106, and a spacer 108 that are removably fastened to one another. The bracket 102 includes a bracket base 110 and bracket arm 112 that are integrally formed. As will be discussed, the bracket arm 112 supports the meter wheel 98 relative to the meter body 58. The bracket 102 also includes studs 113 (see FIG. 19) fixed to the bracket base 110. Furthermore, the frame 96 presents an interior transmission compartment 114 formed by cavities 116*a,b* that communicate with one another and operably receive part of the illustrated meter drive 100 (see FIG. 19). As will be discussed, the compartment 114 is preferably sealed and is configured to receive transmission components of the meter drive 100.

The cover 106 is removably attached to the bracket 102 to enclose the cavities 116 (see FIG. 18). Preferably, the cover 106 is in sealing engagement with the bracket arm 112 when secured thereto so that the drive components within the frame 96 are covered. The sealing engagement restricts the compartment 114 and drive components from being contaminated by dust or other particles from the chamber 62. It is also within the ambit of the present invention for the frame to be alternatively shaped (e.g., to house alternative transmission components of the meter drive, have an open construction such that the transmission components are exposed, etc.).

The spacer 108 generally directs particulate downwardly into the chamber section 82 and toward the guide surface 86 as particulate is advanced through the chamber section 82 by the meter wheel 98 (see FIG. 15). The spacer 108 presents a concave guide surface 118 and opposite end surfaces 120 (see FIG. 17). The spacer 108 is removably attached to the bracket base 110 with fasteners (not shown).

Although the structure of the illustrated frames 96 is preferred, the metering assembly 38 could include an alternative frame construction without departing from the scope of the present invention. Most preferably, however, the frame 96 is designed to support the metering wheel 98 in the common chamber 62 with the other meter wheels 98.

As noted, the frames 96 and particulate plate 60 cooperatively define the chamber sections 82 (see FIGS. 10-15). The particulate plate 60 preferably extends along each of the meter units 56 to define the chamber sections 82 when the particulate plate 60 is in an operating position (see FIGS. 4 and 15). Preferably, each chamber section 82 is laterally aligned with, and is in fluid communication with, a respective outlet passage 80 to discharge the particulate flows F into the respective outlet passage 80 (see FIG. 10). However, it is within the scope of the present invention where the particulate flow F from a chamber section 82 is directed into more than one of the outlet passages 80.

Furthermore, each chamber section 82 and respective outlet passage 80 are preferably laterally aligned with, and in fluid communication with, a corresponding upper module compartment 40*a* and a corresponding lower module compartment 42*a* of the collector modules 40,42. In this manner, each particulate flow F is configured to be directed to the corresponding upper and lower module compartments 40*a*, 42*a*. It is also within the ambit of the present invention where the particulate flow F from a chamber section 82 is directed into more than one of the upper module compartments 40*a* and/or more than one of the lower module compartments 42*a*. Moreover, certain principles of the present invention also apply to an air cart having an alternative collector assembly design or no collector assembly at all.

Turning again to FIGS. 15-19, the illustrated frames 96 are removably secured to the rear wall 64 and are located within the chamber 62 to project in a fore-and-aft direction (see FIG. 15). In particular, the meter unit 56 includes an adapter 122 used to mount the frame 96 on the rear wall 64. The illustrated adapter 122 includes spaced adapter flanges 124*a,b* and a sleeve 126 that interconnects the flanges 124 to provide a unitary structure (see FIG. 19). The adapter 122 presents an adapter opening 127 that extends through the flanges 124*a,b* and the sleeve 126.

To secure the frame 96 to the rear wall 64, the frame 96 is positioned so that the studs 113 pass through holes in the rear wall 64 and the flange 124*a* (see FIG. 15). Fasteners are removably threaded on the studs 113 to secure the adapter 122 and the frame 96 on the rear wall 64 (see FIGS. 15 and 19).

The bracket arm 112 extends forwardly and downwardly from the bracket base 110 to support the meter wheel 98 relative to the meter body 58. The illustrated bracket 102 preferably includes a single bracket arm 112. However, the bracket 102 could include a pair of bracket arms (e.g., to support the meter wheel 98 on opposite sides thereof).

The adapter 122 and the frame 96 also cooperatively support a motor 128 of the meter drive 100 adjacent the meter body 58. The illustrated motor 128 includes a motor flange 130 that is removably mounted on the adapter flange 124*b* with fasteners. As a result, the illustrated adapter 122 removably interconnects the motor 128 and the frame 96.

Turning to FIG. 19, each meter drive 100 preferably includes the motor 128 and a transmission 132 to selectively power one of the meter wheels 98. The motor 128 preferably drives a corresponding one of the meter units 56 and permits each meter unit 56 to be controlled independently of the other meter units 56. The motor 128 preferably comprises a variable-speed electric motor that includes a rotating motor shaft 134. The motor 128 is drivingly attached to the transmission 132 with a conventional shaft coupler 136 (see FIG. 19).

When the motor 128 is on, the motor 128 causes one of the meter wheels 98 to rotate so that the meter wheel 98 generates the respective particulate flow F. When the motor is turned off, the motor 128 restricts rotation of the meter wheel 98 and prevents the flow of particulate material through the respective chamber section 82. Furthermore, the motor speed of the motor 128 could be varied to adjust the flow rate of particulate material through the chamber section 82.

While the illustrated motor 128 is preferably a variable speed electric motor, the metering assembly 38 could use an alternative motor (such as a single-speed electric motor, a hydraulic motor, etc.) without departing from the scope of the present invention.

Furthermore, although each of the meter units 56 is preferably powered by a corresponding motor 128, the units 56 (or a set of the units) could alternatively be driven by a common drive mechanism. For instance, multiple units 56 could be powered by a common shaft (not shown), e.g., a shaft powered by a motor or by a ground travel drive mechanism (which is powered by air cart travel across the ground). For multiple units 56 driven by a common shaft, the meter drive 100 of each meter unit 56 also preferably includes a clutch (also not shown) to selectively power the meter unit 56 with the common shaft.

Turning again to FIGS. 15-19, the meter wheel 98 is configured to meter particulate flow through a respective chamber section 82 and thereby generate a corresponding one of the particulate flows F. The illustrated meter wheel 98 is unitary and presents an axial bore 138 and a key 140 that extends along the bore 138 (see FIG. 17).

The meter wheel 98 also preferably includes a series of blades 142 that are defined by flutes 144 (see FIGS. 17 and 18). Each flute 144 forms a pocket 146 to receive particulate (see FIGS. 17 and 18). Each blade 142 is separated from adjacent blades by corresponding flutes 144. The illustrated blades 142 and flutes 144 are preferably helically shaped. However, the blades 142 and/or flutes 144 could have an alternative shape. For instance, the blades 142 and flutes 144 could extend parallel to the rotating axis of the wheel 98. Also, the wheel 98 could have flutes 144 arranged in a herringbone pattern (or another alternative pattern) or could be devoid of flutes 144.

As will be explained, each meter wheel 98 cooperates with the particulate plate 60 cooperates to generate a particulate flow F through a respective chamber section 82 of the metering assembly 38.

Turning again to FIG. 19, the transmission 132 is operable to transmit power from the motor 128 to the corresponding meter wheel 98. The transmission 132 preferably permits rotation of the meter wheel 98 independently of the other wheels 98. The illustrated transmission 132 comprises a worm drive that includes an input shaft 148, a worm 150, a driven gear 152, and an output shaft 154. However, as will be described, the transmission 132 could take alternative forms without departing from the scope of the present invention.

Turning back to FIGS. 15-19, the output shaft 154 is unitary and presents a slot 156 that receives the key 140 of the meter wheel 98 (see FIG. 18). The output shaft 154 is rotatably supported by the bracket 102, with only one end of the output shaft 154 being rotatably supported on the bracket 102. However, the bracket 102 could be configured to rotatably receive and support both ends of the output shaft 154 without departing from the ambit of the present invention.

The output shaft 154 is rotatably mounted on the arm 112 and extends into and out of the compartment 114. The output shaft 154 is preferably in rotating sealing engagement with the bracket arm 112 to restrict the compartment 114 from fluidly communicating with the chamber 62. In this manner, the sealing engagement restricts the compartment 114 from being contaminated by dust or other particles from the chamber 62.

The driven gear 152 and the meter wheel 98 are both mounted on the output shaft 154 and rotate therewith about a lateral axis (not shown). The driven gear 152 is rotatably received by the compartment 114 (see FIG. 19).

The input shaft 148 is elongated and extends into and out of the compartment 114. The input shaft 148 presents opposite ends that are rotatably supported by respective bearings 158,160 so that the input shaft 148 is rotatably mounted (see FIG. 19). The input shaft 148 is preferably in rotating sealing engagement with the frame 96 to restrict dust or other contaminants from entering the compartment 114.

The worm 150 is fixed (fixedly connected or formed integrally therewith) on the input shaft 148 and rotates therewith. In the usual manner, the worm 150 is positioned in driving engagement with the driven gear 152. Consequently, rotation of the input shaft 148 and the worm 150 causes corresponding rotation of the driven gear 152 and the output shaft 154.

While the illustrated meter drive 100 is preferred, it is also within the ambit of the present invention where the meter unit 56 includes an alternative drive to rotate the wheel 98. In one preferred alternative embodiment, an alternative transmission could include a cogged timing belt, a cogged driven sheave, and a cogged drive sheave to drive the wheel 98. For this alternative timing belt transmission, the driven sheave is mounted on the output shaft 154 in place of the driven gear 152. The drive sheave is mounted on a drive shaft (not shown) to rotate therewith. The drive shaft is located adjacent the motor 128 and is generally parallel to the output shaft 154. An external driven gear is mounted externally to the frame on the drive shaft and rotates therewith.

Also for this timing belt embodiment, the frame is sized to enclose the sheaves and the timing belt. The frame is in sealing engagement with the meter body 58 and extends through the meter body 58 so that the drive shaft is located outside of the meter body 58. As a result, the external driven gear is also outside of the meter body.

The driven gear is drivingly connected to the motor 128 by a conventional right angle gear drive (not shown) and an external drive gear powered by the right angle gear drive. The external drive gear is external to the frame and the meter body 58 and is positioned in intermeshing engagement with the external driven gear.

In another preferred alternative embodiment of the timing belt transmission, the drive sheaves of the meter units 56 are selectively driven by a common shaft (not shown) that extends laterally and is generally parallel to the driven shaft. As will be appreciated, the common shaft can be powered by a motor or by a ground travel drive mechanism powered by air cart travel across the ground. The drive preferably includes a clutch that permits an external drive gear to be selectively powered by the common shaft. The external drive gear is positioned in intermeshing engagement with the external driven gear.

It will also be appreciated that other alternative transmissions could be employed to drive the meter wheel 98. For instance, an alternative transmission could include a chain-and-sprocket drive mechanism. Yet further, for some aspects of the present invention, the metering assembly 38 could be devoid of any transmission between the meter wheel 98 and a motor (or other preferred power source).

Turning to FIGS. 5, 6, and 10-15, the illustrated meter units 56 are installed and compactly arranged in corresponding meter stations 77 (see FIG. 6). The meter units 56 are preferably positioned alongside one another so that the meter wheels 98 are generally axially aligned with one another. That is, the meter wheels 98 generally rotate about the same laterally extending axis. However, for some aspects of the present invention, one or more meter wheels 98 could be axially offset from one another.

The illustrated metering assembly 38 includes six (6) meter units 56, with three (3) meter units 56 located adjacent each side of the meter body 58 (see FIG. 5). Within the remaining central four (4) meter stations 77, the metering assembly 38 preferably includes spacers 161 secured to the meter body 58 (see FIG. 5). The spacers 161 restrict particulate from flowing through the stations 77 and the corresponding outlet passages 80.

It will be appreciated that the metering assembly 38 could have an alternative number of meter units 56. For instance, with particular respect to the illustrated embodiment, the number of meter units 56 in the meter body 58 could range from five (5) to ten (10) without departing from the scope of the present invention.

The illustrated meter units 56 have generally the same construction and are powered in the same manner. However, for certain aspects of the present invention, the air cart 30 could have different types of meter units as part of a single metering assembly. For example, a single metering assembly could have meter units powered by different types of power sources. Also, a single metering assembly could have meter units with different frame constructions, different transmissions, or different meter wheel configurations. That is to say, according to certain aspects of the present invention, the meter units of a given metering assembly need not be identical. In fact, according to some principles of the present invention, the metering assembly may not have all the meter units associated with a single, common chamber (e.g., the metering assembly might alternatively have bifurcated chambers adjacent each side of the machine). However, it is important for purposes of the present invention that the metering assembly have a sealed chamber in which multiple ones of the metering wheels operate such that multiple particulate flows are generated from each chamber.

Again, the preferred particulate plate 60 operably engages all of the meter units 56 in the operating position (see FIG. 15). The axial alignment of the meter wheels 98 is preferred so that the same guide surface 86 cooperates with multiple meter wheels 98 (in the illustrated embodiment, the same guide surface 86 cooperates with all of the meter wheels 98).

In the operating position, the particulate plate 60 cooperates with the meter wheels 98 to direct particulate flows F through chamber sections 82 of the metering assembly 38 (see FIG. 15). More specifically, the guide surface 86 cooperates with the pockets 146 of the meter wheel 98 to capture particulate material. As the wheel 98 and the pockets 146 rotate in the indicated direction (see FIG. 15), the meter wheel 98 moves particulate material along the guide surface 86 from an intake opening 162 to a discharge opening 164 (see FIG. 15).

To enable a compact arrangement of meter units 56, the illustrated frames 96 are preferably compactly positioned in series along the length of the chamber 62. More particularly, the frames 96 are all preferably mounted on the rear wall 64 in an end-to-end configuration where the bracket bases 110 are located end-to-end and are aligned with one another (see FIGS. 10 and 11). Also, the brackets 102 are oriented so that each pair of adjacent bracket arms 112 is spaced apart from each other.

However, the frames 96 could be alternatively arranged without departing from the scope of the present invention. For instance, one or more pairs of adjacent brackets 102 could be oriented in a mirrored configuration where the bracket arms 112 of the bracket pair are located next to each other by inverting one bracket 102 of the pair relative to the other bracket 102.

Preferably, when the particulate plate 60 is in the operating position, each adjacent pair of frames 96 cooperate with the particulate plate 60 to form one of the chamber sections 82 and to also define the intake opening 162 and the discharge opening 164 that communicate with the chamber section 82.

Again, the guide surface 86 defines ridges 90 that are spaced along the length of the particulate plate 60. The ridges 90 are positioned and configured to engage the corresponding bracket arms 112 in the operating position.

The particulate plate 60 is rotatably supported by the rod 94 and can be swung into and out of the operating position. The particulate plate 60 can be swung out of the operating position (in a direction away from the meter units 56) for various purposes (e.g., to permit user access to the meter wheels 98 or removal of the particulate plate 60 from the meter body 58). The particulate plate 60 can also be swung into the operating position and secured with fasteners (not shown). When in the operating position, the lower side margin 84b of the particulate plate 60 engages a shoulder 166 of each bracket arm 112 to restrict swinging of the particulate plate 60 toward the meter units 56 (see FIGS. 15 and 16). Also in the operating position, the curved portion of the guide surface 86 conforms to a rounded end surface 168 presented by the bracket arm 112.

The illustrated particulate plate 60 has a single operating position that is not adjustable. To accommodate different types (e.g., sizes) of particulate material and different particulate flow rates, the particulate plate 60 is preferably replaced with one of several different plates (not shown) having a different guide surfaces. For instance, when in the operating position, the plates could be configured so that the different guide surfaces are spaced from the frames 96 at corresponding dimensions that are different from each other.

However, it is within the scope of the present invention where the particulate plate can be adjustably secured (e.g., with fasteners) among a series of operating positions. Such adjustment of the plate among operating positions can permit the same plate to accommodate different particulates and different particulate flow rates.

The illustrated metering assembly 38 preferably has a single particulate plate 60 that is sized and configured to extend along and engage all of the meter units 56. However, it is within the scope of the present invention where the metering assembly 38 includes an alternative particulate plate construction to engage the meter units 56. For example, certain aspects of the present invention contemplate a metering assembly having multiple particulate plates that each engage a corresponding series or one of meter units 56.

The chamber sections 82 are configured to operably receive meter wheels 98. Each meter wheel 98 is rotatably mounted in a corresponding chamber section 82 to, with the other components (e.g., the adjacent frames 96 and plate 60), generate a flow F of particulate from the intake opening 162 to the discharge opening 164. The chamber sections 82 are configured to receive and permit the particulate flow F to be advanced therethrough as the meter wheel 98 rotates.

Again, the illustrated chamber sections 82 are each cooperatively defined by an adjacent pair of frames 96 and the particulate plate 60. As a result, each chamber section 82 is separated (at least with respect to particulate flow) from an adjacent chamber section 82 by a corresponding bracket arm 112 that extends between the chamber sections 82, although it is important to note that the chamber sections 82 are all still part of the same overall common chamber 62 and are fluidly intercommunicated.

However, it is within the ambit of the present invention where alternative structure extends between and separates the chamber sections 82 from each other. For instance, the assembly 30 could include partitions separate from the frames 96 to extend between adjacent chamber sections 82. Again, it is important for the partitions to only divide the common sealed chamber 62 into fluidly intercommunicated parts, each of which is associated with a respective particulate flow, with all the meter units 56 (including the partitions) being housed in the common meter body.

In operation, the air cart 30 is advanced along a field and discharges seed and/or fertilizer to openers (not shown) of a seeder implement. The conveying system 36 is powered during operation to carry seed and/or fertilizer forwardly along the conveying lines 44,46 toward the openers.

Each metering assembly 38 meters particulate from the corresponding tank 34 and discharges the metered particulate as particulate flows F into the collector modules 40,42. The collector modules 40,42 selectively divert the metered particulate flows F into corresponding conveying lines 44,46. As discussed above, the air streams 48,50 collect the particulate flows F and carry them forwardly.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A mobile air cart comprising:
    a tank configured to contain particulate;
    a pressurized air source;
    a plurality of pneumatic conveying lines fluidly coupled to the pressurized air source, such that an air stream is provided within each conveying line; and
    a metering assembly configured to receive particulate from the tank and coupled to the pneumatic conveying lines so as to deliver particulate thereto, said metering assembly including—
        wall structure defining a unitary, common metering chamber, an inlet through which particulate from the tank enters the common metering chamber, and an outlet through which metered particulate exits the common metering chamber and moves toward the conveying lines, and
        a plurality of meter units configured to meter and separate particulate within the common metering chamber into respective particulate flows corresponding to the conveying lines,
        each of said meter units including a rotatable metering wheel, with rotation of the metering wheel serving to meter the respective particulate flow,
        said meter units including independently controllable drives for powering the metering wheels, such that each metering wheel is selectively and individually rotatable,
        each of said meter units including a frame that projects into the common metering chamber,
        said frames supporting the metering wheels within the common metering chamber.

2. The mobile air cart as claimed in claim 1,
    said wall structure including a plurality of sealingly interconnected walls that restrict leakage of pressurized air from the common metering chamber.

3. The mobile air cart as claimed in claim 2,
    said frames sectioning the common metering chamber so that each metering wheel is operably located within, and the respective particulate flow is metered through, a corresponding chamber section.

4. The mobile air cart as claimed in claim 3,
    each of said metering wheels being rotatable about a laterally extending axis.

5. The mobile air cart as claimed in claim 4,
    said walls including laterally extending front and rear walls and laterally spaced apart sidewalls extending between the front and rear walls.

6. The mobile air cart as claimed in claim 5,
    said frames extending into the common metering chamber from a respective one of the walls, with each chamber section being defined between adjacent ones of the frames.

7. The mobile air cart as claimed in claim 6,
    said frames projecting in a fore-and-aft direction from one of the front and rear walls.

8. The mobile air cart as claimed in claim 7,
    said metering wheels being rotatable about the same laterally extending axis.

9. The mobile air cart as claimed in claim 8,
    said metering assembly including an adjustable particulate plate that extends across multiple chamber sections to thereby cooperate with the corresponding metering wheels to control the respective particulate flows.

10. The mobile air cart as claimed in claim 9,
    said frame presenting an interior transmission compartment,
    said drive including a transmission at least partly located within the compartment.

11. The mobile air cart as claimed in claim 10,
    said drive including an electric motor drivingly coupled to the transmission.

12. The mobile air cart as claimed in claim 1,
    said frame presenting an interior transmission compartment,
    said drive including a transmission at least partly located within the compartment.

13. The mobile air cart as claimed in claim 12,
    said drive including an electric motor drivingly coupled to the transmission.

14. The mobile air cart as claimed in claim 13,
    said transmission including a plurality of intermeshing gears.

15. The mobile air cart as claimed in claim 12,
said transmission compartment being sealingly closed,
said transmission including an output shaft projecting from the frame,
said metering wheel being fixed to the output shaft.

16. The mobile air cart as claimed in claim 15,
said frames sectioning the common metering chamber so that each metering wheel is operably located within, and the respective particulate flow is metered through, a corresponding chamber section.

17. The mobile air cart as claimed in claim 1,
said frames sectioning the common metering chamber so that each metering wheel is operably located within, and the respective particulate flow is metered through, a corresponding chamber section,
said metering assembly including an adjustable particulate plate that extends across multiple chamber sections to thereby cooperate with the corresponding metering wheels to control the respective particulate flows.

18. The mobile air cart as claimed in claim 17,
each metering wheel presenting circumferentially spaced, radially recessed, particulate-receiving pockets,
said particulate plate assisting with particulate retention within the pockets.

19. The mobile air cart as claimed in claim 1,
each of said metering wheels being rotatable about a laterally extending axis.

20. The mobile air cart as claimed in claim 19,
said wall structure including a plurality of sealingly interconnected walls that restrict leakage of pressurized air from the common metering chamber,
said frames projecting in a fore-and-aft direction from one of the walls.

* * * * *